(12) United States Patent
Mukhopadhyay et al.

(10) Patent No.: US 10,022,843 B2
(45) Date of Patent: *Jul. 17, 2018

(54) METHODS OF FABRICATING A POLYCRYSTALLINE DIAMOND COMPACT

(71) Applicant: US SYNTHETIC CORPORATION, Orem, UT (US)

(72) Inventors: Debkumar Mukhopadhyay, Sandy, UT (US); Kenneth E. Bertagnolli, Riverton, UT (US); Cody William Knuteson, Salem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,237

(22) Filed: Feb. 24, 2017

(65) Prior Publication Data

US 2017/0157746 A1     Jun. 8, 2017

Related U.S. Application Data

(63) Continuation of application No. 14/677,859, filed on Apr. 2, 2015, now Pat. No. 9,610,555, which is a
(Continued)

(51) Int. Cl.
*E21B 10/56* (2006.01)
*E21B 10/567* (2006.01)
(Continued)

(52) U.S. Cl.
CPC ........... *B24D 18/0009* (2013.01); *B24D 3/10* (2013.01); *C04B 35/52* (2013.01); *C04B 41/009* (2013.01);
(Continued)

(58) Field of Classification Search
CPC .... B01J 3/06; B01J 3/062; B01J 3/065; B22F 7/06; B22F 2999/00; E21B 10/55; E21B 10/56; E21B 10/567; E21B 10/5735
See application file for complete search history.

(56) References Cited

U.S. PATENT DOCUMENTS 3,935,034 A    1/1976   Hayes
4,268,276 A    5/1981   Bovenkerk
(Continued)

FOREIGN PATENT DOCUMENTS

CA    2281546 C    4/2002
EP    1079063 A1   2/2001
(Continued)

OTHER PUBLICATIONS

Non-Final Office Action for U.S. Appl. No. 14/304,631 dated Mar. 23, 2017.
(Continued)

*Primary Examiner* — Pegah Parvini
(74) *Attorney, Agent, or Firm* — Dorsey & Whitney LLP

(57) ABSTRACT

Embodiments of the invention relate to methods of forming polycrystalline diamond compacts ("PDCs"), wherein the PDC includes a polycrystalline diamond ("PCD") table in which at least one Group VIII metal is at least partially alloyed with phosphorus and/or at least one other alloying element to improve the thermal stability of the PCD table. The disclosed PDCs may be used in a variety of applications, such as rotary drill bits, machining equipment, and other articles and apparatuses.

28 Claims, 11 Drawing Sheets

Related U.S. Application Data continuation-in-part of application No. 14/086,283, filed on Nov. 21, 2013, now Pat. No. 9,765,572, and a continuation-in-part of application No. 14/304,631, filed on Jun. 13, 2014.

(51) Int. Cl.

| | | |
|---|---|---|
| *B24D 18/00* | (2006.01) | |
| *C04B 35/52* | (2006.01) | |
| *C04B 41/00* | (2006.01) | |
| *C04B 41/51* | (2006.01) | |
| *C04B 41/88* | (2006.01) | |
| *B24D 3/10* | (2006.01) | |
| *C22C 26/00* | (2006.01) | |
| *E21B 10/55* | (2006.01) | |

(52) U.S. Cl.
CPC ...... *C04B 41/5177* (2013.01); *C04B 41/5194* (2013.01); *C04B 41/88* (2013.01); *C22C 26/00* (2013.01); *E21B 10/567* (2013.01); *C04B 2235/427* (2013.01); *E21B 10/55* (2013.01)

(56) References Cited

U.S. PATENT DOCUMENTS

| | | | |
|---|---|---|---|
| 4,274,900 A | | 6/1981 | Mueller et al. |
| 4,404,413 A | * | 9/1983 | Haskell ................. C07C 7/20 585/2 |
| 4,410,054 A | | 10/1983 | Nagel et al. |
| 4,468,138 A | | 8/1984 | Nagel |
| 4,560,014 A | | 12/1985 | Geczy |
| 4,738,322 A | | 4/1988 | Hall et al. |
| 4,811,801 A | | 3/1989 | Salesky et al. |
| 4,907,377 A | | 3/1990 | Csillag et al. |
| 4,913,247 A | | 4/1990 | Jones |
| 5,016,718 A | | 5/1991 | Tandberg |
| RE33,767 E | | 12/1991 | Christini et al. |
| 5,092,687 A | | 3/1992 | Hall |
| 5,120,327 A | | 6/1992 | Dennis |
| 5,127,923 A | | 7/1992 | Bunting et al. |
| 5,135,061 A | | 8/1992 | Newton, Jr. |
| 5,154,245 A | | 10/1992 | Waldenstrom et al. |
| 5,364,192 A | | 11/1994 | Damm et al. |
| 5,368,398 A | | 11/1994 | Damm et al. |
| 5,460,233 A | | 10/1995 | Meany et al. |
| 5,480,233 A | | 1/1996 | Cunningham |
| 5,544,713 A | | 8/1996 | Dennis |
| 5,759,216 A | | 6/1998 | Kanada et al. |
| 6,261,329 B1 | | 7/2001 | Ogata et al. |
| 6,338,754 B1 | | 1/2002 | Cannon et al. |
| 6,541,115 B2 | | 4/2003 | Pender et al. |
| 6,793,681 B1 | | 9/2004 | Pope et al. |
| 7,353,893 B1 | | 4/2008 | Hall et al. |
| 7,473,287 B2 | | 1/2009 | Belnap et al. |
| 7,635,035 B1 | | 12/2009 | Bertagnolli et al. |
| 7,647,993 B2 | | 1/2010 | Middlemiss |
| 7,726,421 B2 | | 6/2010 | Middlemiss |
| 7,866,418 B2 | | 1/2011 | Bertagnolli et al. |
| 7,950,477 B1 | | 5/2011 | Bertagnolli et al. |
| 7,998,573 B2 | | 8/2011 | Qian et al. |
| 8,034,136 B2 | | 10/2011 | Sani |
| 8,069,935 B1 | | 12/2011 | Miess et al. |
| 8,080,071 B1 | | 12/2011 | Vail |
| 8,109,349 B2 | | 2/2012 | Hall et al. |
| 8,236,074 B1 | | 8/2012 | Bertagnolli et al. |
| 8,277,722 B2 | | 10/2012 | DiGiovanni |
| 8,820,442 B2 | * | 9/2014 | Gonzalez ............ B24D 99/005 175/428 |
| 2008/0219914 A1 | | 9/2008 | Smallman et al. |
| 2011/0030283 A1 | | 2/2011 | Cariveau et al. |
| 2011/0067929 A1 | | 3/2011 | Mukhopadhyay et al. |
| 2012/0012401 A1 | * | 1/2012 | Gonzalez ............ B24D 99/005 175/428 |
| 2012/0012402 A1 | | 1/2012 | Thigpen et al. |
| 2012/0152622 A1 | | 6/2012 | Sue et al. |
| 2012/0241226 A1 | | 9/2012 | Bertagnolli et al. |
| 2012/0261197 A1 | | 10/2012 | Miess et al. |
| 2012/0324801 A1 | | 12/2012 | Fang |
| 2012/0325565 A1 | | 12/2012 | Fang |
| 2013/0067826 A1 | | 3/2013 | Vaughn et al. |
| 2013/0068540 A1 | | 3/2013 | DiGiovanni |
| 2013/0092451 A1 | | 4/2013 | Mukhopadhyay et al. |
| 2013/0092452 A1 | | 4/2013 | Mukhopadhyay et al. |
| 2013/0180181 A1 | | 7/2013 | Nixon et al. |
| 2014/0047776 A1 | | 2/2014 | Scott et al. |
| 2014/0283457 A1 | | 9/2014 | Cariveau et al. |
| 2015/0209745 A1 | | 7/2015 | Mukhopadhyay et al. |
| 2015/0209937 A1 | | 7/2015 | Mukhopadhyay et al. |
| 2015/0211306 A1 | | 7/2015 | Mukhopayhyay et al. |

FOREIGN PATENT DOCUMENTS

| | | |
|---|---|---|
| EP | 1149937 B1 | 4/2009 |
| GB | 376467 | 7/1932 |
| GB | 1496106 | 12/1977 |
| JP | H09254042 A | 9/1997 |
| WO | 2008062369 A2 | 5/2008 |
| WO | 2008/074010 A1 | 6/2008 |
| WO | 2012139060 A1 | 10/2012 |
| WO | 2012173893 A1 | 12/2012 |
| WO | 2013/092370 A1 | 6/2013 |

OTHER PUBLICATIONS

Notice of Allowance for U.S. Appl. No. 14/086,283 dated May 24, 2017.
"Final Office Action for U.S. Appl. No. 14/086,283 dated Feb. 3, 2017".
"International Search Report and Written Opinion from International Application No. PCT/US2014/058121 dated Mar. 31, 2015".
"International Search Report and Written Opinion from International Application No. PCT/US2015034900 dated Dec. 10, 2015".
"Non-Final Office Action for U.S. Appl. No. 14/086,283 dated Aug. 24, 2016".
"Non-Final Office Action for U.S. Appl. No. 14/677,821 dated Sep. 23, 2016".
"Notice of Allowance for U.S. Appl. No. 14/677,859 dated Aug. 3, 2016".
"Notice of Allowance received for U.S. Appl. No. 14/677,859 dated Nov. 21, 2016".
"Partial International Search Report from International Application No. PCT/US2015/034900 dated Sep. 29, 2015".
"Restriction Requirement for U.S. Appl. No. 14/086,283 dated Apr. 15, 2016".
"Restriction Requirement received for U.S. Appl. No. 14/304,631 dated Nov. 17, 2016".
"U.S. Appl. No. 12/555,715, filed Sep. 9, 2008".
"U.S. Appl. No. 13/275,372, filed Oct. 18, 2011".
"U.S. Appl. No. 13/751,405, filed Jan. 28, 2013".
"U.S. Appl. No. 14/086,283, filed Nov. 21, 2013".
"U.S. Appl. No. 14/304,631, filed Jun. 13, 2014".
"U.S. Appl. No. 14/677,821, filed Apr. 2, 2015".
"U.S. Appl. No. 14/677,859, filed Apr. 2, 2015".
"U.S. Appl. No. 14/677,875, filed Apr. 2, 2015".
Ahmed, Waqar et al., "Chemical Vapor Deposition of Diamond Coatings onto Dental Burrs", Journal of Chemical Education, vol. 80 No. 6, Jun. 2003, pp. 636-641.
Cremer, R. et al., "Formation of Intermetallic CObalt Phases in teh Near Surface Region of Cemented Carbides for Improved Diamond Layer Deposition", Thin Solid Films 355-356, 1999, pp. 127-133.
Decker, D.L. et al., "High-Pressure Calibration: A Critical Review", J. Phys. Chem. Ref. Data, vol. 1, No. 3, 1972, pp. 1, 3.
Guobiao, Lin et al., "Boronizing Mechanism of Cemented Carbides and Their Wear Resistance", Int. Journal of Refractory Metals and Hard Materials, 41, 2013, pp. 351-355.
Ishida, K. et al., "The Co—P (Cobalt-Phosphorus) System", Bulletin of Alloy Phase Diagrams, ASM International, vol. 11, No. 6, Dec. 1, 1990, pp. 555-559.

(56) References Cited

OTHER PUBLICATIONS

Rousse, G. et al., "Structure of the Intermediate Phase of PbTe at High Pressue", Physical Review B: Condensed Matter and Materials Physics, 71, 2005, pp. 224116.
Notice of Allowance of U.S. Appl. No. 14/304,631 dated Dec. 5, 2017.
Notice of Allowance for U.S. Appl. No. 14/304,631 dated Aug. 9, 2017.

* cited by examiner

METHODS OF FABRICATING A POLYCRYSTALLINE DIAMOND COMPACT

CROSS-REFERENCE TO RELATED APPLICATIONS

This application is a continuation of U.S. application Ser. No. 14/677,859 filed on 2 Apr. 2015, which is a continuation-in-part of U.S. application Ser. No. 14/086,283 filed on 21 Nov. 2013 and a continuation-in-part of U.S. application Ser. No. 14/304,631 filed on 13 Jun. 2014. The disclosure of each of the foregoing applications is incorporated, in its entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container with a volume of diamond particles positioned on a surface of the cemented carbide substrate. A number of such containers may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a metal-solvent catalyst to promote intergrowth between the diamond particles, which results in formation of a matrix of bonded diamond grains having diamond-to-diamond bonding therebetween. Interstitial regions between the bonded diamond grains are occupied by the metal-solvent catalyst.

Despite the availability of a number of different PDCs, manufacturers and users of PDCs continue to seek PDCs with improved mechanical properties.

SUMMARY

Embodiments of the invention relate to methods of forming PDCs in which the PDC includes a PCD table having at least one Group VIII metal at least partially alloyed with phosphorus and/or other alloying element(s) (e.g., boron) to improve the thermal stability of the PCD table. In an embodiment, a method of fabricating a PDC is disclosed. A PCD table bonded to a substrate is provided. The PCD table includes a plurality of interstitial regions that are at least partially occupied by at least one Group VIII metal. An assembly is formed by positioning one or more phosphorus materials including phosphorus and/or other alloying element(s) (e.g., boron) adjacent to at least a portion of the upper surface of the PCD table. The assembly is subjected to an inert environment (e.g., a partial vacuum, a vacuum of at least about $10^{-2}$ torr, and/or an inert atmosphere). While subjected to the inert environment, the assembly is heated at an effective temperature and for effective time to alloy at least some of the at least one Group VIII metal with the one or more phosphorus materials and/or the other alloying element(s).

In an embodiment, a method of fabricating a PDC is disclosed. A preformed PCD table is provided including a plurality of interstitial regions that are at least partially occupied by at least one Group VIII metal. An assembly is formed by positioning one or more phosphorus materials including phosphorus and/or other alloying element(s) (e.g., boron) adjacent to at least a portion of an upper surface of the PCD table. The assembly is subjected to an inert environment (e.g., a vacuum of at least about $10^{-2}$ torr and/or an inert atmosphere). While subjected to the inert environment, the assembly is heated at an effective temperature and for effective time to alloy at least some of the at least one Group VIII metal with the one or more phosphorus materials and/or the other alloying element(s).

In an embodiment, a method of fabricating a PDC is disclosed. An assembly is formed by positioning a plurality of diamond particles between one or more phosphorus materials and/or other alloying element(s) (e.g., boron), and a substrate including at least one Group VIII metal. The assembly is subjected to an inert environment (e.g., a vacuum of at least about $10^{-2}$ torr and/or inert atmosphere). While the assembly is subject to the inert environment, the assembly is subjected to a first HPHT process at a temperature and pressure effective to cause the at least one Group VIII metal to infiltrate at least some of the interstitial regions of the plurality of diamond particles and catalyze formation of a PCD table from the plurality of diamond particles. While the assembly is subjected to the inert environment, the assembly is subjected to a second HPHT process at a temperature and pressure effective to cause at least some of the one or more phosphorus materials and/or other alloying element(s) to alloy with at least some of the at least one Group VIII metal in the PCD table.

In an embodiment, a method of fabricating a PDC is disclosed. A PDC is provided that includes a PCD table bonded to an interfacial surface of a substrate. The PCD table includes an upper surface remote from the interfacial surface of the substrate and at least one lateral surface extending between the upper surface of the PCD table and the interfacial surface of the substrate. The PCD table includes a plurality of bonded diamond grains defining a plurality of interstitial regions, with at least a portion of the plurality of interstitial regions including at least one Group VIII metal disposed therein. Phosphorus and/or other types of ions are implanted into at least a portion of the at least one Group VIII metal adjacent to the upper surface of the PCD table.

Other embodiments include application utilizing the disclosed PDCs in various articles and apparatuses, such as rotary drill bits, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to methods of forming PDCs in which the PDC includes a PCD table having at least one Group VIII metal at least partially alloyed with phosphorus and/or other alloying element(s) (e.g., boron) to improve the thermal stability of the PCD table. The disclosed PDCs may be used in a variety of applications, such as rotary drill bits, machining equipment, and other articles and apparatuses.

Figure 1A:
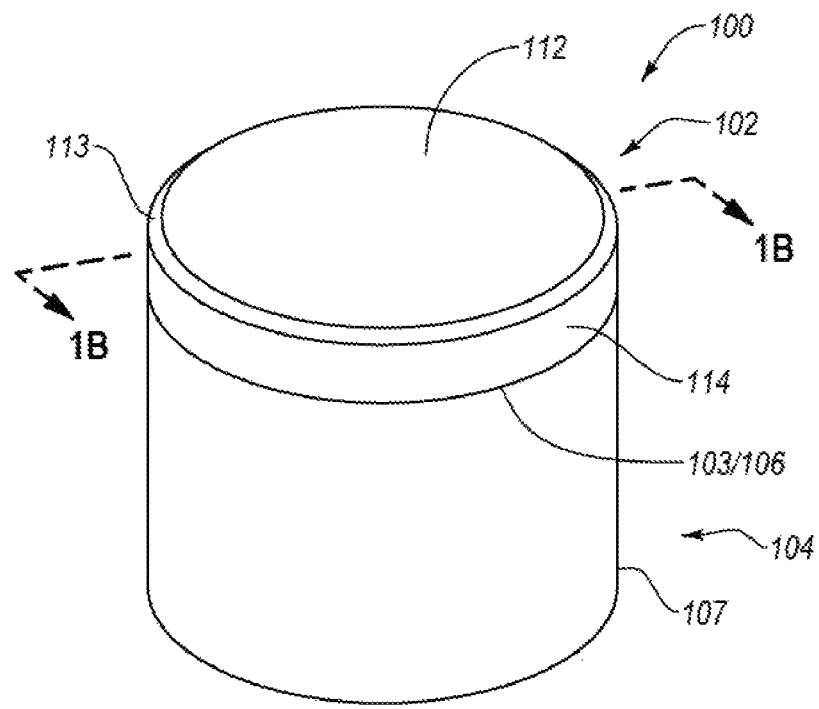
FIG. 1A is an isometric view of an embodiment of a PDC according to an embodiment.
Figure 1B:
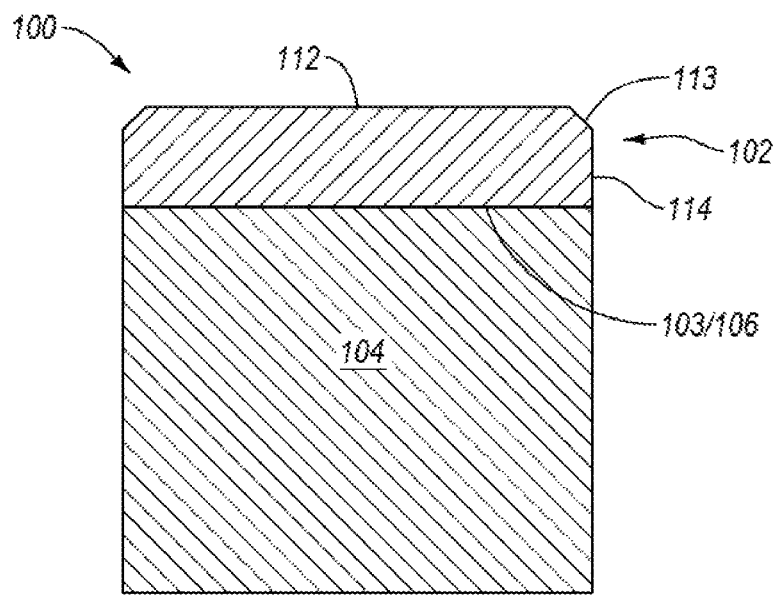
FIG. 1B is a cross-sectional view of the PDC shown in FIG. 1A taken along line 1B-1B thereof.

FIGS. 1A and 1B are isometric and cross-sectional views, respectively, of an embodiment of a PDC 100. The PDC 100 includes a PCD table 102 having an interfacial surface 103, and a substrate 104 having an exterior lateral surface 107 and an interfacial surface 106 that is bonded to the interfacial surface 103 of the PCD table 102. The substrate 104 may comprise, for example, a cemented carbide substrate, such as tungsten carbide, tantalum carbide, vanadium carbide, niobium carbide, chromium carbide, titanium carbide, or combinations of the foregoing carbides cemented with iron, nickel, cobalt, or alloys thereof. In an embodiment, the cemented carbide substrate comprises a cobalt-cemented tungsten carbide substrate. The substrate 104 may include a metal-solvent catalyst as a cementing constituent including at least one Group VIII metal, such as cobalt, iron, nickel, or alloys thereof. Alternatively or additionally, the substrate 104 may include a carbonate catalyst. While the PDC 100 is illustrated as being generally cylindrical, the PDC 100 may exhibit any other suitable geometry and may be non-cylindrical. Additionally, while the interfacial surfaces 103 and 106 are illustrated as being substantially planar, the interfacial surfaces 103 and 106 may exhibit complementary non-planar configurations.

The PCD table 102 may be integrally formed with the substrate 104. For example, the PCD table 102 may be integrally formed with the substrate 104 in an HPHT process by sintering of diamond particles on the substrate 104, or preformed and bonded to the substrate 104. The PCD table 102 further includes a plurality of directly bonded-together diamond grains exhibiting diamond-to-diamond bonding (e.g., $sp^3$ bonding) therebetween. The plurality of directly bonded-together diamond grains define a plurality of interstitial regions. For example, the diamond grains of the PCD table 102 may exhibit an average grain size of about less than 40 μm, about less than 30 μm, about 18 μm to about 30 μm, or about 18 μm to about 25 μm (e.g., about 19 μm to about 21 μm). The PCD table 102 defines the upper surface 112, at least one lateral surface 114, and an optional peripherally-extending chamfer 113 that extends between the at least one lateral surface 114 and the upper surface 112.

A metallic interstitial constituent is disposed in at least a portion of the interstitial regions of the PCD table 102. In an embodiment, the metallic interstitial constituent includes and/or is formed from an alloy that is chosen to exhibit a selected melting temperature or melting temperature range and bulk modulus that are sufficiently low so that it does not break diamond-to-diamond bonds between bonded diamond grains during heating experienced during use, such as cutting operations. During cutting operations using the PCD table 102, the metallic interstitial constituent may potentially extrude out of the PCD table 102. However, before, during, and after the cutting operations, the PCD table 102 still includes the metallic interstitial constituent distributed substantially entirely throughout the PCD table 102.

According to various embodiments, the alloy includes at least one Group VIII metal including cobalt, iron, nickel, or alloys thereof and at least one alloying element. The at least one alloying element may be selected from silver, gold, aluminum, antimony, boron, carbon, cerium, chromium, copper, dysprosium, erbium, iron, gallium, germanium, gadolinium, hafnium, holmium, indium, lanthanum, magnesium, manganese, molybdenum, niobium, neodymium, nickel, phosphorous, praseodymium, platinum, ruthenium, sulfur, antimony, scandium, selenium, silicon, samarium, tin, tantalum, terbium, tellurium, thorium, titanium, vanadium, tungsten, yttrium, zinc, zirconium, and any combination thereof. For example, a more specific group for the alloying element includes boron, copper, gallium, germanium, gadolinium, phosphorous, silicon, tin, zinc, zirconium, and combinations thereof. In another embodiment, an even more specific group for the alloying element includes boron, phosphorous, and combinations thereof. The at least one alloying element may be present in the at least one Group VIII metal in an amount of about greater than 0 to about 50 atomic %, about 5 atomic % to about 35 atomic %, about 15 atomic % to about 35 atomic %, about 20 atomic % to about 35 atomic %, about 5 atomic % to about 15 atomic %, or about 30 weight % to about 35 weight % of the alloy.

In an embodiment, the at least one alloying element includes one or more phosphorus materials, which may include phosphorus. For example, the one or more phosphorous materials may include substantially only phosphorous. In an embodiment, the at least one alloying element material may include a compound including phosphorus and one or more of the other alloying elements disclosed herein.

The phosphorus and/or the at least one other alloying element may be present with the at least one Group VIII metal in an amount at a eutectic composition, hypo-eutectic composition, or hyper-eutectic composition for the at least one Group VIII-phosphorus and/or the at least one other alloying element chemical system if the at least one Group VIII-phosphorus and/or the at least one other alloying element has a eutectic composition. The phosphorus and/or the at least one other alloying element may lower a melting temperature of the at least one Group VIII metal, a bulk modulus of the at least one Group VIII metal, a coefficient of thermal expansion of the at least one Group VIII metal, or combinations thereof.

Table I below lists various different embodiments for the at least one alloying element of the alloy. For some of the at least one alloying elements, the eutectic composition with cobalt and the corresponding eutectic temperature at 1 atmosphere is also listed. As previously noted, in such alloys, in some embodiments, the at least one alloying element may be present at a eutectic composition, hypo-eutectic composition, or hyper-eutectic composition for the cobalt-alloying element chemical system.

TABLE I

| Alloying Element | Melting Point (° C.) | Eutectic Composition (Atomic %) | Eutectic Temperature (° C.) |
|---|---|---|---|
| Silver (Ag) | 960.8 | N/A | N/A |
| Aluminum (Al) | 660 | N/A | N/A |
| Gold (Au) | 1063 | N/A | N/A |
| Boron (B) | 2030 | 18.5 | 1100 |
| Bismuth (Bi) | 271.3 | N/A | N/A |
| Carbon (C) | 3727 | 11.6 | 1320 |
| Cerium (Ce) | 795 | 76 | 424 |
| Chromium (Cr) | 1875 | 44 | 1395 |
| Copper (Cu) | 1085 | N/A | N/A |
| Dysprosium (Dy) | 1409 | 60 | 745 |
| Erbium (Er) | 1497 | 60 | 795 |
| Iron (Fe) | 1536 | N/A | N/A |
| Gallium (Ga) | 29.8 | 80 | 855 |
| Germanium (Ge) | 937.4 | 75 | 817 |
| Gadolinium (Gd) | 1312 | 63 | 645 |
| Hafnium (Hf) | 2222 | 76 | 1212 |
| Holmium (Ho) | 1461 | 67 | 770 |

TABLE I-continued

| Alloying Element | Melting Point (° C.) | Eutectic Composition (Atomic %) | Eutectic Temperature (° C.) |
|---|---|---|---|
| Indium (In) | 156.2 | 23 | 1286 |
| Lanthanum (La) | 920 | 69 | 500 |
| Magnesium (Mg) | 650 | 98 | 635 |
| Manganese (Mn) | 1245 | 36 | 1160 |
| Molybdenum (Mo) | 2610 | 26 | 1335 |
| Niobium (Nb) | 2468 | 86.1 | 1237 |
| Neodymium (Nd) | 1024 | 64 | 566 |
| Nickel (Ni) | 1453 | N/A | N/A |
| Phosphorus (P) | 44.1 (white), 610 (black), 621 (red) | 19.9 | 1023 |
| Praseodymium (Pr) | 935 | 66 | 560 |
| Platinum (Pt) | 1769 | N/A | N/A |
| Ruthenium (Ru) | 2500 | N/A | N/A |
| Sulfur (S) | 119 | 41 | 822 |
| Antimony (Sb) | 630.5 | 97 | 621 |
| Scandium (Sc) | 1539 | 71.5 | 770 |
| Selenium (Se) | 217 | 44.5 | 910 |
| Silicon (Si) | 1410 | 23 | 1195 |
| Samarium (Sm) | 1072 | 64 | 575 |
| Tin (Sn) | 231.9 | N/A | N/A |
| Tantalum (Ta) | 2996 | 13.5 | 1276 |
| Terbium (Tb) | 1356 | 62.5 | 690 |
| Tellurium (Te) | 449.5 | 48 | 980 |
| Thorium (Th) | 1750 | 38 | 960 |
| Titanium (Ti) | 1668 | 76.8 | 1020 |
| Vanadium (V) | 1900 | N/A | N/A |
| Tungsten (W) | 3410 | N/A | N/A |
| Yttrium (Y) | 1409 | 63 | 738 |
| Zinc (Zn) | 419.5 | N/A | N/A |
| Zirconium (Zr) | 1852 | 78.5 | 980 |

The at least one Group VIII metal may be infiltrated from the cementing constituent of the substrate 104 (e.g., cobalt from a cobalt-cemented tungsten carbide substrate) and alloyed with the phosphorus and/or the at least one other alloying element provided from a source other than the substrate 104. For example, the phosphorus and/or the at least one other alloying element may form an alloy with the at least one Group VIII metal and mixed with the diamond particles, the phosphorus and/or the at least one other alloying element (e.g., in powder or granule form) may be mixed with diamond particles prior to HPHT processing, the phosphorus and/or the at least one other alloying element being diffused into the at least one Group VIII metal after it has infiltrated the diamond particles used to form the diamond grains, or combinations thereof. In such an embodiment, a depletion region of the at least one Group VIII metal in the substrate 104 in which the concentration of the at least one Group VIII metal is less than the concentration prior to being bonded to the PCD table 102 may be present at and near the interfacial surface 106. In such an embodiment, the at least one Group VIII metal may form and/or carry tungsten and/or tungsten carbide with it during infiltration into the diamond particles being sintered that, ultimately, forms the PCD table 102.

Depending on the alloy system, in some embodiments, the alloy disposed interstitially in the PCD table 102 may include: one or more solid solution alloy phases of the at least one Group VIII metal and the at least one alloying element (e.g., phosphorous), one or more intermediate compound phases (e.g., one or more intermetallic compounds) between the at least one alloying element (e.g., phosphorus and/or boron) and the at least one Group VIII metal and/or other metal (e.g., tungsten); one or more binary or higher order intermediate compound phases; elemental phosphorus and/or the at least one other alloying element; carbon, optionally other metal(s); or combinations thereof. In some embodiments, when the one or more intermediate compounds are present in the alloy, the one or more intermediate compounds are present in an amount less than about 40 weight % of the alloy, such as less than about 30 weight % less, less than about 20 weight %, less than about 15 weight %, less than about 10 weight %, about 5 weight % to about 35 weight %, about 10 weight % to about 30 weight %, about 15 weight % to about 25 weight %, about 5 weight % to about 10 weight %, about 1 weight % to about 4 weight %, or about 1 weight % to about 3 weight %, with the balance being the one or more solid solution phases and/or one or more carbide phases. In other embodiments, when the one or more intermediate compounds are present in the alloy, the one or more intermediate compounds may be present in the alloy in an amount greater than about 80 weight % of the alloy, such as greater than about 90 weight %, about 90 weight % to about 100 weight %, about 90 weight % to about 95 weight %, about 90 weight % to about 97 weight %, about 92 weight % to about 95 weight %, about 97 weight % to about 99 weight %, or about 100 weight % (i.e., substantially all of the alloy). That is, in some embodiments, the alloy may be a multi-phase alloy that may include one or more solid solution alloy phases, one or more intermediate compound phases, one or more carbide phases, one or more elemental constituent (e.g., an elemental phosphorus and/or other elemental alloying element, or an elemental group VIII metal) phase, or combinations thereof. The inventors currently believe that the presence of the one or more intermediate compounds may enhance the thermal stability of the PCD table 102 due to the relatively lower coefficient of thermal expansion of the one or more intermediate compounds compared to a pure Group VIII metal, such as cobalt. Additionally, in some embodiments, the inventors currently believe that the presence of the solid solution alloy of the at least one Group VIII metal may enhance the thermal stability of the PCD table 102 due to lowering of the melting temperature and/or bulk modulus of the at least one Group VIII metal. In some embodiments, the presence of the solid solution alloy of the at least one Group VIII metal and the phosphorus may decrease or eliminate the tendency of the Group VIII metal therein to cause back-conversion of carbon atoms in the PCD table 102 to graphite at high temperatures such as during working conditions.

For example, when the at least one Group VIII element is cobalt and the at least one alloying element is boron, the alloy may include WC phase, $Co_AW_BB_C$ (e.g., $Co_{21}W_2B_6$) phase, $Co_DB_E$ (e.g., $Co_2B$ or $BCo_2$) phase, and Co phase (e.g., substantially pure cobalt or a cobalt solid solution phase) in various amounts. According to one or more embodiments, the WC phase may be present in the alloy in an amount less than 1 weight %, or less than 3 weight %; the $Co_AW_BB_C$ (e.g., $Co_{21}W_2B_6$) phase may be present in the alloy in an amount less than 1 weight %, about 2 weight % to about 5 weight %, more than 10 weight %, about 5 weight % to about 10 weight %, or more than 15 weight %; the $Co_DB_E$ (e.g., $Co_2B$ or $BCo_2$) phase may be present in the alloy in an amount greater than about 1 weight %, greater than about 2 weight %, or about 2 weight % to about 5 weight %; and the Co phase (e.g., substantially pure cobalt or a cobalt solid solution phase) may be present in the alloy in an amount less than 1 weight %, or less than 3 weight %. Any combination of the recited concentrations for the foregoing phases may be present in the alloy. In some embodiments, the maximum concentration of the $Co_{21}W_2B_6$ may occur at an intermediate depth below the working upper surface 112 of the PCD table 102, such as about 0.010 inches to about 0.040 inches, about 0.020 inches to about 0.040 inches, or about 0.028 inches to about 0.035 inches (e.g., about 0.030 inches) below the working upper surface 112 of the PCD table. In the region of the PCD table 102 that has the maximum concentration of the $Co_{21}W_2B_6$ phase, the diamond content of the PCD table may be less than 90 weight %, such as about 80 weight % to about 85 weight %, or about 81 weight % to about 84 weight % (e.g., about 83 weight %). Any combination of the recited concentrations for the foregoing phases (or other concentrations disclosed herein) may be present in the alloy.

As previously noted, in some embodiments, the phosphorus and/or other ones of the at least one alloying element may be present at a eutectic composition, hypo-eutectic composition, or hyper-eutectic composition for the Group VIII-phosphorus and/or other ones of the at least one alloying element chemical system. For example, cobalt and phosphorus have at least one eutectic composition at about 19.9 atomic % phosphorus. The cobalt-phosphorus eutectic composition has a eutectic temperature at about 1023° C. In another embodiment, nickel and phosphorus have at least two eutectic compositions at about 19 atomic % phosphorus and about 47 atomic % phosphorus. The nickel-phosphorus eutectic compositions have eutectic temperatures at about 891° C. and about 860° C., respectively. In another embodiment, iron and phosphorus have at least three eutectic compositions at about 17 atomic % phosphorus, about 24 atomic % phosphorus, and about 40 atomic % phosphorus. The iron-phosphorus eutectic compositions have eutectic temperatures at about 1048° C., about 1166° C. and about 1262° C., respectively.

In another embodiment, the Group VIII metal may be cobalt, the phosphorus material phase may include phosphorus and boron (e.g., a BP phase, a boron phase and/or a phosphorus phase), and the substrate 104 is a cobalt-cemented tungsten carbide substrate. In such an embodiment, the metallic interstitial constituent may include a number of different intermediate compounds, such as PB, $Co_2P$, CoP, BCo, $Co_2B$, $CoB_2$, WC, $W_2B_5$, $B_2CoW_2$, $Co_{21}W_2B_6$, $Co_3W_3C$, $CoW_2B_2$, CoWB, or combinations thereof. The metallic interstitial constituent may additionally include a Co phase (e.g., substantially pure cobalt or a cobalt solid solution phase), an elemental phosphorus phase in various amounts, and an elemental boron phase in various amounts. In an embodiment, the metallic interstitial constituent may not include an elemental phosphorus phase or an elemental boron phase.

Depending on the HPHT processing technique used to form the PDC 100, the alloy disposed in the interstitial regions of the PCD table 102 may exhibit a concentration that is substantially uniform throughout the PCD table 102. This may occur when the one or more phosphorus materials and/or other alloying elements are provided by mixing one or more phosphorus materials and/or other alloying elements in powder or granular form with diamond particles prior to HPHT processing. In other embodiments, the concentration of the alloy disposed in the interstitial regions of the PCD table 102 may exhibit a gradient (e.g., a substantially continuous gradient) in which the concentration of the phosphorus and/or other alloying elements decreases with distance away from the upper surface 112 of the PCD table 102 toward the substrate 104. This may occur when the one or more phosphorus materials and/or other alloying elements are provided by placing a powder, disc, film, etc. of the one or more phosphorus materials and/or other alloying elements adjacent to one or more outside surfaces (e.g., corresponding to the at least a portion of an at least one lateral surface 114 and/or upper surface 112) of the volume of diamond particles prior to HPHT processing. In such an embodiment, if present at all, the alloy may exhibit a decreasing concentration of any intermediate compounds with distance away from the upper surface 112 of the PCD table 102.

The depth to which the phosphorus and/or other alloying elements is present in the PCD table 102 may depend upon one or more of the following: the temperature of the HPHT process, the type of phosphorus and/or other alloying elements used in the HPHT processing, the technique used to introduce the phosphorus and/or other alloying elements to the PCD table 102, or the amount of phosphorus and/or other alloying elements used in the manufacture of the PCD table 102. For example, the depth to which the phosphorus from the one or more phosphorus materials and/or other alloying elements is present in the alloy of the PCD table 102 as measured from the upper surface 112 may be at least about 250 µm, about 400 µm to about 700 µm, or about 600 µm to about 800 µm.

Figure 1C:
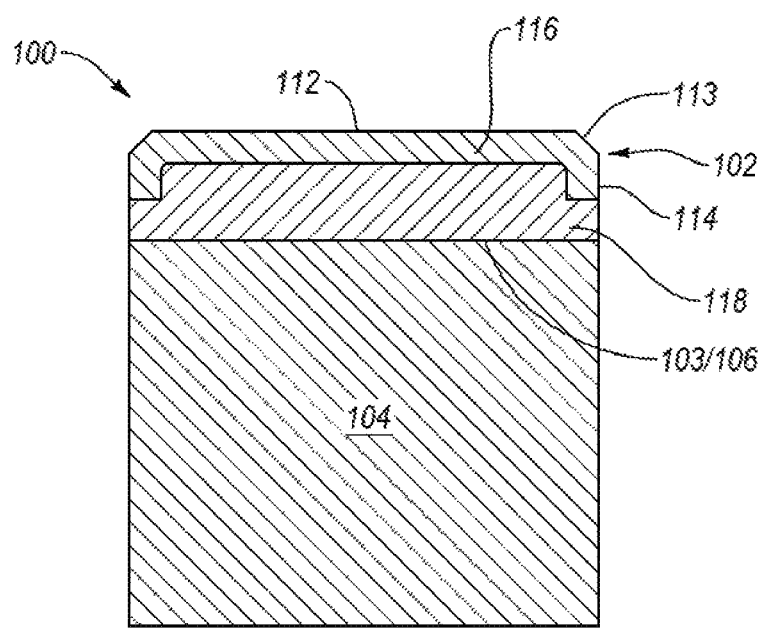
FIGS. 1C and 1D are cross-sectional views of the PDC shown in FIG. 1A taken along line 1B-1B thereof, each of which exhibits a different geometry for the region treated with phosphorus and/or other alloying element(s) according to an embodiment.

In some embodiments, when the one or more phosphorus materials including the phosphorus thereof and/or other alloying elements are capable of diffusing into the PCD table 102 and alloying with at least one Group VIII metal, the inventors currently believe that the depth of diffusion of at least phosphorus from the one or more phosphorus materials and/or other alloying elements should be sufficient so that the alloy forms at a depth of at least about 250 µm as measured from the upper surface 112 and/or at least one lateral surface 114. Such diffusion may improve thermal stability and/or wear resistance relative to a PCD table that does not contain appreciable amounts of the at least one alloying element. Referring to FIG. 1C, the phosphorus and/or other alloying elements may diffuse into the PCD table from an outside surface thereof, thereby forming at least two distinct regions of the PCD table 102. A first region 116 may be formed extending inwardly from the upper surface 112 and generally contouring the chamfer 113. In an embodiment, the alloy may consist essentially of an intermediate compound of at least one alloying element and the at least one Group VIII metal in the interstitial regions of the first region and a second region 118 adjacent to the substrate 104, with the second region 118 being substantially free of the at least one intermediate compound in which the interstitial regions thereof include cobalt in elemental and/or solid solution form. Optionally, the at least one alloying element and/or the elemental form of the at least one alloying element may be present in the second region 118.

In an embodiment, when the one or more phosphorus materials includes only phosphorus and at least one Group VIII metal is cobalt, the inventors currently believe that a depth of phosphorus diffusion (e.g., a presence of $Co_2P$) of at least about 250 µm as measured from the upper surface 112 improves thermal stability and/or wear resistance relative to a PCD table that does not contain appreciable amounts of phosphorus. Referring again to FIG. 1C, in such an embodiment in which the phosphorus is diffused into the PCD table 102 from an outside surface thereof, the first region 116 may extend inwardly from the upper surface 112 and generally contour the chamfer 113. In such an embodiment, the alloy may consist essentially of $Co_2P$ in the interstitial regions of the first region 116 and the second region 118 may be substantially free of $Co_2P$ in which the interstitial regions thereof include cobalt in elemental and/or solid solution form. Optionally, elemental phosphorus may be present in the second region 118. In an embodiment in which the at least one Group VIII metal is iron, the alloy of the first region 116 may consist essentially of $Fe_3P$ and/or $Fe_2P$ in the interstitial regions and the second region 118 adjacent to the substrate 104, with the second region 118 being substantially free of $Fe_3P$ and/or $Fe_2P$. Optionally, the interstitial regions of the second region 118 may include iron in elemental and/or solid solution form and may include phosphorus in solid solution form and/or elemental phosphorus in the interstitial regions. In an embodiment in which the at least one Group VIII metal is nickel, the alloy of the first region 116 may consist essentially of $Ni_3P$ and/or $Ni_5P_2$ in the interstitial regions and the second region 118 adjacent to the substrate 104 may be substantially free of $Ni_3P$ and/or $Ni_5P_2$ in the interstitial regions thereof. Optionally, the second region 118 may include of the second region 118 may include nickel in elemental and/or solid solution form and may include phosphorus in solid solution form and/or elemental phosphorus in the interstitial regions. In other embodiments, as an alternative to or in addition to phosphorous, any of the other ones of the at least one alloying elements disclosed herein (e.g., boron) may be employed.

Figure 1D:
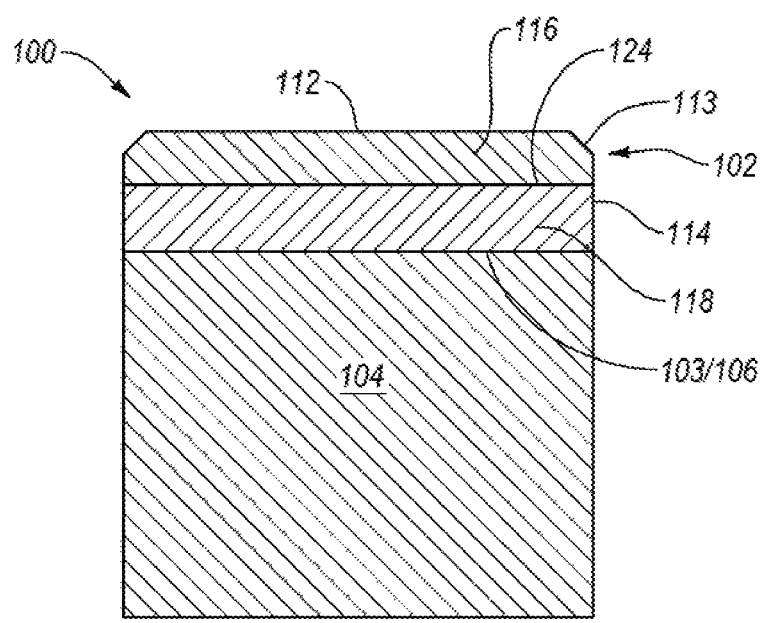

FIG. 1D illustrates another embodiment in which the first region 116 exhibits a different configuration than that shown in FIG. 1C. The geometry of the first region 116 may define a substantially horizontal boundary 124 between the first region 116 and the underlying second region 118. In the illustrated embodiment, the substantially horizontal boundary 124 is located below the chamfer 113. However, in other embodiments, the substantially horizontal boundary 124 may be located substantially at the bottom of the chamfer 113. While the substantially horizontal boundary 124 is illustrated as being substantially planar, in some embodiments, the boundary between the first region and the underlying second region 118 may be substantially non-planar (e.g., domed, zig-zagged, stepped, dimpled, arcuate, undulating, sinusoidal, combinations thereof, or any other non-planar configuration).

It should be noted that when the one or more phosphorus materials and/or other alloying element(s) are mixed with the diamond particles used to form the PCD table (either in a powder form and/or pre-alloyed with the at least one Group VIII metal in powder form such as $Co_2P$ particles), the alloy may be substantially homogenous and the concentration of the phosphorus and/or other alloying element(s) may be substantially uniform throughout the PCD table 102. For example, in an embodiment, the alloy may include almost entirely $Co_2P$ when the at least one Group VIII metal is cobalt and the one or more phosphorus materials includes only phosphorus; the alloy may include almost entirely $Fe_3P$ and/or $Fe_2P$ when the at least one Group VIII metal is iron and the one or more phosphorus materials includes only phosphorus; or the alloy may include almost entirely $Ni_3P$ and/or $Ni_5P_2$ when the at least one Group VIII metal is nickel and the one or more phosphorus materials includes only phosphorus. Alternatively, the PCD table may be formed from a first diamond powder containing the one or more phosphorus materials and/or other alloying element(s) and a second diamond powder that is substantially free of the one or more phosphorus materials and/or other alloying element(s). The first diamond powder and the second diamond powder may be positioned relative a substrate to form a first layer including the first diamond powder and a second layer proximate the substrate including the second diamond powder. The resulting PCD table 102 may include a first region 116 including the alloy in the interstitial regions thereof, and a second region 118 that is substantially free of the alloy in the interstitial regions thereof. For example, the first region 116 may be adjacent to the upper surface and the second region 118 may be remote from the upper surface 112.

The alloy of the PCD table 102 may be selected from a number of different alloys exhibiting a melting temperature of about 1400° C. or less and a bulk modulus at 20° C. of about 150 GPa or less. As used herein, melting temperature refers to the lowest temperature at which melting of a material begins at standard pressure conditions (i.e., 100 kPa). For example, depending upon the composition of the alloy, the alloy may melt over a temperature range such as occurs when the alloy has a hypereutectic composition or a hypoeutectic composition where melting begins at the solidus temperature and is substantially complete at the liquidus temperature. In other cases, the alloy may have a single melting temperature as occurs in a substantially pure metal or a eutectic alloy.

In one or more embodiments, the alloy may exhibit a coefficient of thermal expansion of about $3 \times 10^{-6}$ per ° C. to about $20 \times 10^{-6}$ per ° C., a melting temperature of about 180° C. to about 1300° C., and a bulk modulus at 20° C. of about 30 GPa to about 150 GPa; a coefficient of thermal expansion of about $15 \times 10^{-6}$ per ° C. to about $20 \times 10^{-6}$ per ° C., a melting temperature of about 180° C. to about 1100° C., and a bulk modulus at 20° C. of about 50 GPa to about 130 GPa; a coefficient of thermal expansion of about $15 \times 10^{-6}$ per ° C. to about $20 \times 10^{-6}$ per ° C., a melting temperature of about 950° C. to about 1100° C. (e.g., 1090° C.), and a bulk modulus at 20° C. of about 120 GPa to about 140 GPa (e.g., about 130 GPa); or a coefficient of thermal expansion of about $15 \times 10^{-6}$ per ° C. to about $20 \times 10^{-6}$ per ° C., a melting temperature of about 180° C. to about 300° C. (e.g., about 250° C.), and a bulk modulus at 20° C. of about 45 GPa to about 55 GPa (e.g., about 50 GPa). For example, the alloy may exhibit a melting temperature of less than about 1200° C. (e.g., less than about 1100° C.) and a bulk modulus at 20° C. of less than about 140 GPa (e.g., less than about 130 GPa). For example, the alloy may exhibit a melting temperature of less than about 1200° C. (e.g., less than 1100° C.), and a bulk modulus at 20° C. of less than about 130 GPa.

When the HPHT sintering pressure is greater than about 7.5 GPa cell pressure, optionally in combination with the average diamond grain size being less than about 30 μm, any portion of the PCD table 102 (prior to being leached) defined collectively by the bonded diamond grains and the alloy may exhibit a coercivity of about 115 Oe or more and the alloy content in the PCD table 102 may be less than about 7.5% by weight as indicated by a specific magnetic saturation of about 15 G·cm³/g or less. In another embodiment, the coercivity may be about 115 Oe to about 250 Oe and the specific magnetic saturation of the PCD table 102 (prior to being leached) may be greater than 0 G·cm³/g to about 15 G·cm³/g. In another embodiment, the coercivity may be about 115 Oe to about 175 Oe and the specific magnetic saturation of the PCD may be about 5 G·cm³/g to about 15 G·cm³/g. In yet another embodiment, the coercivity of the PCD table (prior to being leached) may be about 155 Oe to about 175 Oe and the specific magnetic saturation of the first region 116 may be about 10 G·cm³/g to about 15 G·cm³/g. The specific permeability (i.e., the ratio of specific magnetic saturation to coercivity) of the PCD table 102 may be about 0.10 G·cm³/g·Oe or less, such as about 0.060 G·cm³/g·Oe to about 0.090 G·cm³/g·Oe. In some embodiments, the average grain size of the bonded diamond grains may be less than about 30 μm and the alloy content in the PCD table 102 (prior to being leached) may be less than about 7.5% by weight (e.g., about 1% to about 6% by weight, about 3% to about 6% by weight, or about 1% to about 3% by weight). Additionally, details about magnetic properties that the PCD table 102 may exhibit are disclosed in U.S. Pat. No. 7,866,418, the disclosure of which is incorporated herein, in its entirety, by this reference.

In an embodiment, the PDC 100 may be characterized by measuring the depth profile of the alloy. The depth profile may be measured using x-ray diffraction, an x-ray transmission technique, other characterization techniques, or combinations thereof. For example, the PDC 100 may be destructively characterized by removing a layer of the PCD table 102 via grinding and using an x-ray diffraction technique to determine the composition of the alloy as a function of depth. In another example, the PDC 100 may be characterized using an x-ray microscope.

In some embodiments in which the at least one Group VIII metal is cobalt and the PCD table 102 is unleached, the PDC 100 may exhibit a thermal stability characterized by a distance that it may cut in a mill test (as described in more detail below) prior to failure of at least about 155 inches, such as 155 inches to about 300 inches, 160 inches to about 170 inches, about 170 inches to about 220 inches, about 190 inches to about 240 inches, about 220 inches to about 260 inches, or about 250 inches to about 290 inches. The thermal stability may be evaluated in a mill test in which the PDC is used to cut a Barre granite workpiece without any coolant (i.e., dry cutting of the Barre granite workpiece in air). The test parameters used for the mill test may be a back rake angle for the PDC of about 20°, an in-feed for the PDC of about 50.8 cm/min, a width of cut for the PDC of about 7.62 cm (i.e., two PDC cutters mounted to a fly cutter assembly), a depth of cut for the PDC of about 0.762 mm, a rotary speed on the workpiece about 3000 RPM, an indexing across the workpiece (e.g., in the Y direction) of about 7.62 cm, about 20 seconds between cutting passes, and the size of the Barre granite workpiece may be approximately 30.48 cm wide by 30.48 cm high by 73.66 cm long. The PDC may be held in a cutting tool holder, with the substrate of the PDC tested thermally insulated on its back lateral via an alumina disk and along its circumference by a plurality of zirconia pins. Failure is considered when the PDC can no longer cut the workpiece.

Figure 2:
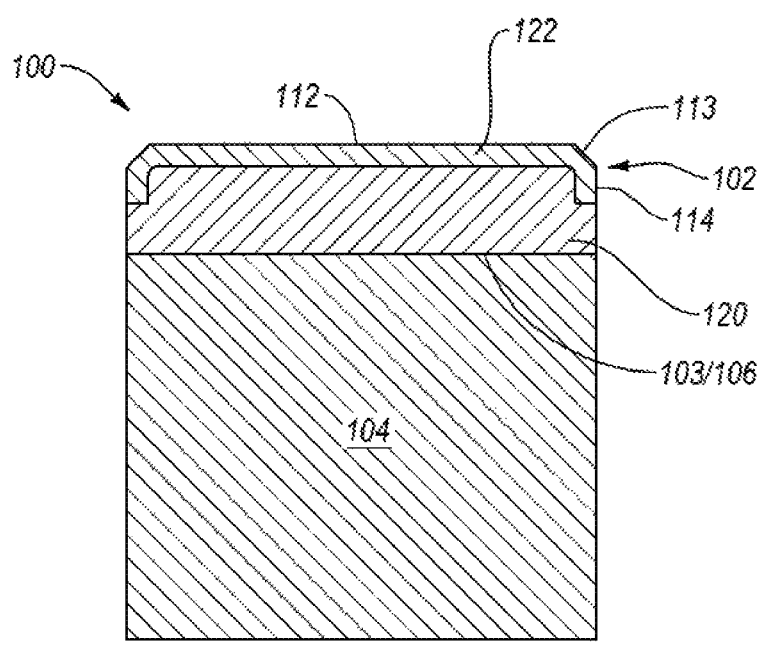
FIG. 2 is a cross-sectional view of another embodiment in which the PCD table shown in FIGS. 1A and 1B is leached to deplete the metallic interstitial constituent from a leached region thereof according to an embodiment.

Referring specifically to the cross-sectional view of FIG. 2, in an embodiment, the PCD table 102 may be leached to improve the thermal stability thereof. The PCD table 102 includes a region 120 adjacent to the interfacial surface 106 of the substrate 104. The metallic interstitial constituent occupies at least a portion of the interstitial regions of the region 120 of the PCD table 102. For example, the metallic interstitial constituent may be any of the alloys disclosed herein. The PCD table 102 also includes a leached region 122 remote from the substrate 104 that includes the upper surface 112, the chamfer 113, and a portion of the at least one lateral surface 114. The leached region 122 extends inwardly to a selected depth or depths from the upper surface 112, the chamfer 113, and a portion of the at least one lateral surface 114.

The leached region 122 has been leached to deplete the metallic interstitial constituent therefrom that previously occupied the interstitial regions between the bonded diamond grains of the leached second region 122. The leaching may be performed in a suitable acid (e.g., aqua regia, nitric acid, hydrofluoric acid, or combinations thereof) and/or or gaseous leaching agent so that the leached second region 122 is substantially free of the metallic interstitial constituent. As a result of the metallic interstitial constituent (e.g., a Group VIII metal-phosphorus alloy such as a cobalt-phosphorus alloy) being depleted from the leached second region 122, the leached second region 122 is relatively more thermally stable than the underlying first region 120.

Generally, a selected leach depth 123 of the leached second region 122 may be greater than 250 μm. For example, the selected leach depth 123 for the leached second region 122 may be about 300 μm to about 425 μm, about 250 μm to about 400 μm, about 350 μm to about 400 μm, about 350 μm to about 375 μm, about 375 μm to about 400 μm, or about 500 μm to about 650 μm. The selected leach depth 123 may be measured inwardly from at least one of the upper surface 112, the chamfer 113, or the at least one lateral surface 114. Any of the embodiments of PDCs described herein may include a leached region extending any of the leach depths described above. Any of the leached regions described herein may include at least a portion of any of the first regions described herein. For example, any of the embodiments described with respect to FIGS. 1C and 1D may include a leached region as described with respect to FIG. 2.

Figure 3A:
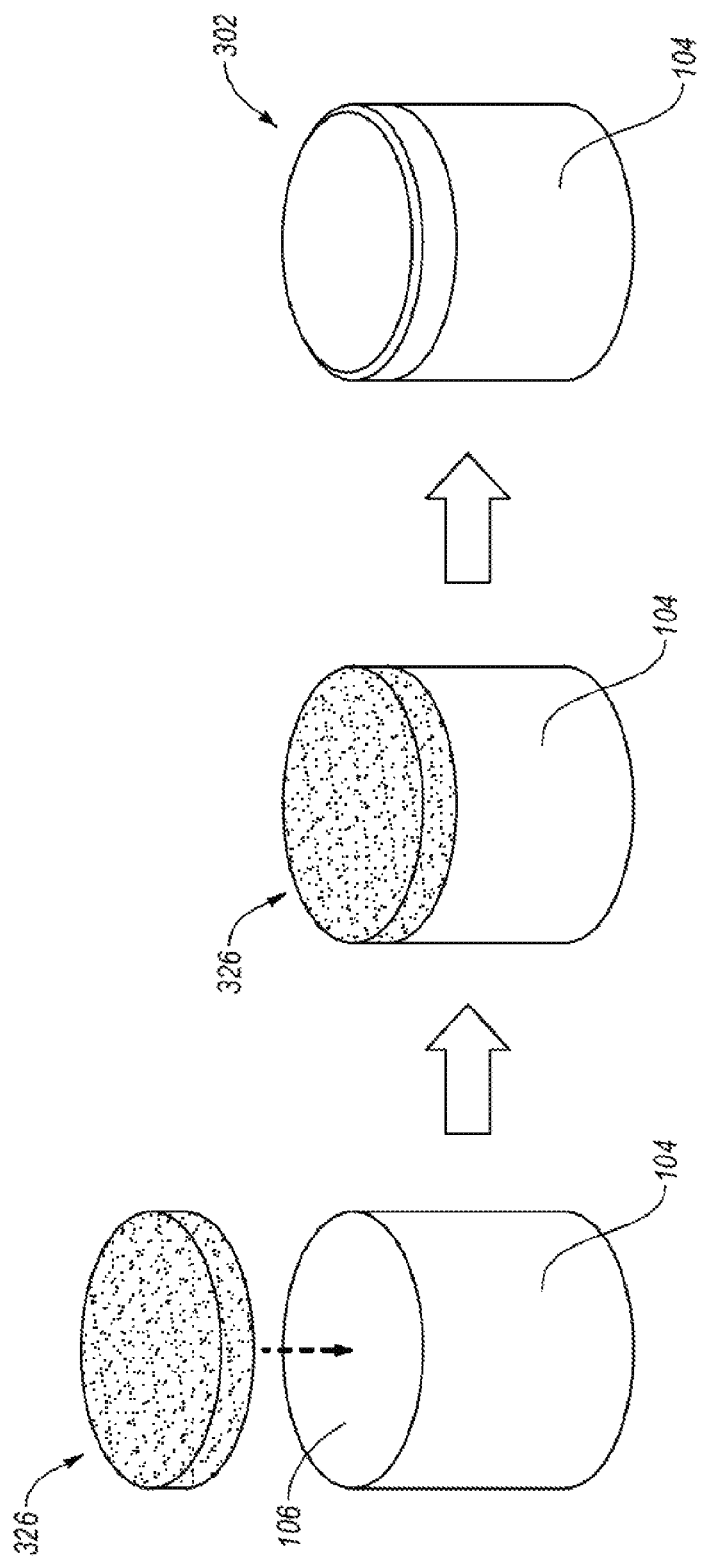
FIG. 3A is a schematic illustration of a method of fabricating a precursor PDC used during the fabrication of the PDC shown in FIGS. 1A and 1B according to an embodiment.

FIG. 3A is a schematic illustration of an embodiment of a method of fabricating a precursor PDC 300 according to an embodiment. With reference to FIG. 3A, a volume of diamond particles 326 may be positioned adjacent to an interfacial surface 106 of a substrate 104. The substrate 104 may be made from any of the substrate materials disclosed herein. For example, the substrate 104 may comprise a cobalt-cemented tungsten carbide substrate.

The diamond particles may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). In various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In an embodiment, the plurality of diamond particles may include a portion exhibiting a relatively larger size between about 40 μm and about 15 μm and another portion exhibiting a relatively smaller size between about 12 μm and 2 μm. Of course, the diamond particles may also include three or more different sizes (e.g., one relatively larger size and two or more relatively smaller sizes), without limitation.

The diamond particles 326 and substrate 104 may be placed in a pressure transmitting medium to form a cell assembly. For example, the pressure transmitting medium may include a refractory metal can, graphite structure, pyrophyllite, other pressure transmitting structures, or combinations thereof. Examples of suitable gasket materials and cell structures for use in manufacturing the PDCs or PCD disclosed herein are disclosed in U.S. Pat. Nos. 6,338,754 and 8,236,074, each of which is incorporated herein, in their entirety, by this reference. Another example of a suitable pressure transmitting material is pyrophyllite, which is commercially available from Wonderstone Ltd. of South Africa. The cell assembly, including the pressure transmitting medium and the diamond particles therein, is subjected to an HPHT process at diamond-stable conditions using an ultra-high pressure press at a temperature of at least about 1000° C. (e.g., about 1100° C. to about 2200° C., about 1200° C. to about 1600° C., or about 1200° C. to about 1450° C.) and a cell pressure in the pressure transmitting medium of at least about 4 GPa (e.g., about 5.0 GPa to about 12 GPa, about 7.5 GPa to about 11 GPa, about 7.5 GPa to about 15 GPa, or at least about 7.5 GPa) for a time sufficient to sinter the diamond particles and form PCD table 302 comprising directly bonded-together diamond grains defining interstitial regions. For example, the pressure in the pressure transmitting medium employed in the HPHT process may be at least about 7.5 GPa, at least about 8.0 GPa, at least about 9.0 GPa, at least about 10.0 GPa, at least about 11.0 GPa, at least about 12.0 GPa, or at least about 14 GPa.

In an embodiment, during the HPHT process, the at least one Group VIII metal from the substrate 104 or another source (e.g., metal-solvent catalyst mixed with the diamond particles) may liquefy and infiltrate into the volume of diamond particles 326 and sinter the diamond particles together to form a PCD table 302 having diamond grains exhibiting diamond-to-diamond bonding (e.g., $sp^3$ bonding) therebetween. The at least one Group VIII metal may be disposed in the interstitial regions between the diamond grains. For example, if the substrate 304 is a cobalt-cemented tungsten carbide substrate, cobalt from the substrate 104 may liquefy and infiltrate the volume of diamond particles 326 to catalyze formation of the PCD table 302.

The pressure values employed in the HPHT processes disclosed herein refer to the cell pressure in the pressure transmitting medium at room temperature (e.g., about 25° Celsius) with application of pressure using an ultra-high pressure press and not the pressure applied to exterior of the cell assembly. The actual pressure in the pressure transmitting medium at sintering temperature may be slightly higher. The ultra-high pressure press may be calibrated at room temperature by embedding at least one calibration material that changes structure at a known pressure such as, PbTe, thallium, barium, or bismuth in the pressure transmitting medium. Further, optionally, a change in resistance may be measured across the at least one calibration material due to a phase change thereof. For example, PbTe exhibits a phase change at room temperature at about 6.0 GPa and bismuth exhibits a phase change at room temperature at about 7.7 GPa. Examples of suitable pressure calibration techniques are disclosed in G. Rousse, S. Klotz, A. M. Saitta, J. Rodriguez-Carvajal, M. I. McMahon, B. Couzinet, and M. Mezouar, "Structure of the Intermediate Phase of PbTe at High Pressure," Physical Review B: Condensed Matter and Materials Physics, 71, 224116 (2005) and D. L. Decker, W. A. Bassett, L. Merrill, H. T. Hall, and J. D. Barnett, "High-Pressure Calibration: A Critical Review," J. Phys. Chem. Ref. Data, 1, 3 (1972). Additionally, details about fabricating a precursor PDC 300 according to known techniques is disclosed in U.S. Pat. No. 7,866,418, the disclosure of which was previously incorporated by reference.

Figure 3B:
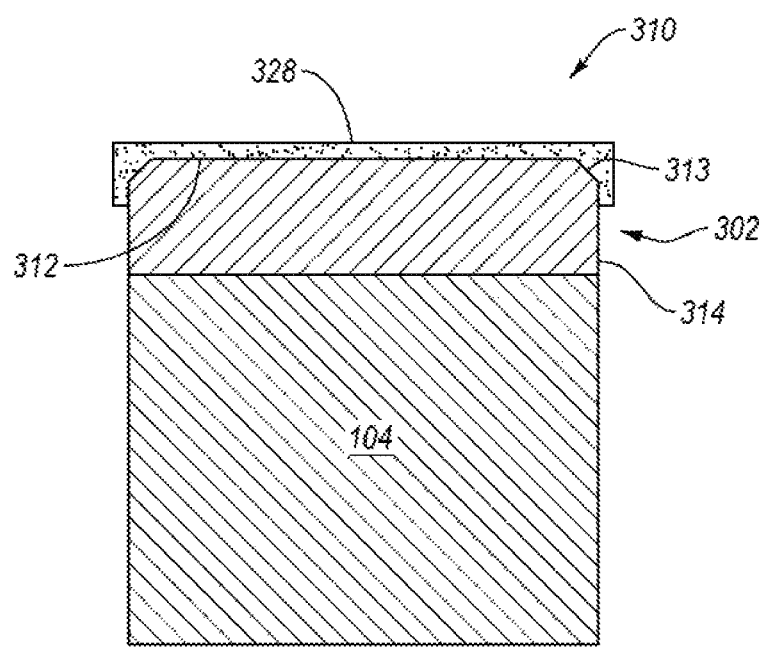
FIG. 3B is a cross-sectional view of the precursor PDC assembly during the fabrication of the PDC shown in FIGS. 1A and 1B according to other embodiment.

FIG. 3B is a cross-sectional view of a PDC assembly 310 during the fabrication of the PDC 100 as shown in FIGS. 1A to 1D according to another embodiment of a method. The PDC assembly 310 includes the precursor PDC 300 fabricated in FIG. 3A. Thus, the PCD table 302 includes bonded diamond grains exhibiting diamond-to-diamond bonding (e.g., $sp^3$ bonding) therebetween, with at least one Group VIII metal (e.g., cobalt) disposed interstitially between the bonded diamond grains.

At least one material 328 may be positioned adjacent to an upper surface 312 of the PCD table 302 of the precursor PDC 300 to form the PDC assembly 310. The at least one material 328 may include one or more phosphorus materials and/or any of the at least one other alloying elements disclosed herein (e.g., boron). For example, the at least one material 328 may be in the form of particles of the one or more phosphorus materials, a thin disc of the one or more phosphorus materials, a green body of particles of the one or more phosphorus materials, or combinations thereof. For example, the phosphorus may be in the form of any type of phosphorus, such as white phosphorus, red phosphorus, violet phosphorus, black phosphorus, or combinations thereof. Any of the types of phosphorus forms may be in amorphous or crystalline form. In an embodiment, the one or more phosphorus materials may include a mixture including phosphorus and any of the at least other alloying elements disclosed herein.

In an embodiment, the at least one material 328 may in the form of a thin disc or pellet that may be formed and/or machined to shape to contour the PCD table 302 prior to being positioned adjacent to the upper surface to conform to the surfaces of the PCD table 302. For example, the PCD table 302 may have a chamfer 313 extending between the upper surface 312 and at least one lateral surface 314. The at least one material 328 may be formed or machined to substantially conform to the chamfer 313, the at least one lateral surface 314, and the upper surface 312 of the PCD table 302. However, in some embodiments, the PCD table 302 may not have a chamfer.

The one or more phosphorus materials (e.g., phosphorous) and/or any of the at least one other alloying elements disclosed herein (e.g., boron) may exhibit an average particle size between about 1 nm to about 500 μm, such as about 10 nm to about 100 nm, about 100 nm to about 1000 nm, about 1 μm to about 10 μm, about 10 μm to about 20 μm, about 20 μm to about 50 μm, and about 50 μm to about 500 μm. The one or more phosphorus materials may exhibit a single-mode particle size distribution, or a bimodal or greater multi-modal particle size distribution.

In an embodiment, the PDC assembly 310 may be configured to limit infiltration of, for example, the phosphorus and/or any of the at least one other alloying elements disclosed herein (e.g., boron) from the at least one material 328 into the PCD table 302. For example, in some embodiments, the at least one material 328 is limited and/or prevented from contacting the substrate 104 to limit/prevent damaging and/or weakening the bond between the PCD table 302 and the substrate 104. In an embodiment, the PDC assembly 310 may be formed such that less than about 0.1 inches in length of at least one lateral surface 314 of the PCD table 302 (e.g., less than about 0.06 inches, less than about 0.04 inches, or about 0.02 inches to about 0.1 inches) is exposed to and/or contact with the at least one material 328. Such an embodiment may limit and/or substantially prevent infiltration of the phosphorus and/or any of the at least one other alloying elements disclosed herein to a region of the PCD table 302 that is proximate the interfacial surface of the substrate 104. For example, the at least one material 328 may be a thin disc that includes red phosphorus. Such a thin disc of the at least one material 328 may be formed or machined such that at least one material 328 may contact less than 0.04 inches of the at least one lateral surface 314 of the PCD table 302. Alternatively, in another embodiment, the PDC assembly 310 may be formed to infiltrate phosphorus from the at least one material 328 into substantially the entire PCD table.

Because the PCD table 302 is already formed, any of the phosphorus materials disclosed herein may be used, regardless of its melting temperature. In an embodiment, the PDC assembly 310 may be subjected to heating process in a furnace at an effective temperature lower than about 1000° C. sufficient to alloy phosphorous and/or any of the at least one other alloying elements disclosed herein (e.g., boron) with the at least one Group VIII metal in the PCD table 302. For example, the effective temperature may be about 200° C. to about 800° C., about 200° C. to about 400° C., about 400° C. to about 800° C., about 600° C. to about 800° C., about 500° C. to about 700° C., about 800° C. to about 1000° C. and about 400° C. to about 600° C. The furnace temperature may be selected based on the melting temperature of the at least one material 328 and the diffusivity of the one or more phosphorus materials and/or any of the at least one other alloying elements disclosed herein (e.g., boron) into the Group VIII metal.

In an embodiment, the heating process used to heat the PDC assembly 310 to the effective temperature may be performed in an inert environment, such as an at least partial vacuum (e.g., less than ambient atmospheric pressure) and/or an inert atmosphere. For example, the at least one material 328 may at least partially include elemental phosphorus. Elemental phosphorus is highly reactive and may react with oxygen in air. As such, in an embodiment, the heating process may be performed in a vacuum furnace including an at least partial vacuum. For example, a partial vacuum may exhibit a pressure less than about $10^{-2}$ torr, such as about $10^{-3}$ torr to about $10^{-9}$ torr, about $10^{-2}$ torr to about $10^{-5}$ torr, about $10^{-5}$ torr to about $10^{-9}$ torr, or less than about $10^{-9}$ torr. In another embodiment, the heating process may be performed in a furnace including an inert atmosphere. The inert atmosphere contains little to no oxygen and/or other reactive gases and primarily includes at least one inert gas. The at least one inert gas may include argon, helium, nitrogen, carbon dioxide, any other inert gas, or combinations thereof. In an embodiment, the PDC assembly 310 may be subjected to a vacuum that may be flushed with or include an inert gas to reduce or prevent the reactivity with the elemental phosphorus. The PDC assembly 310 may be subjected to heating process for an effective time period greater than or less than about 12 hours (e.g., less than about 10 hours, less than about 8 hours, about 5 hours to about 12 hours, or about 7 hours to about 10 hours) at any of the temperature, vacuum, and/or inert atmosphere conditions disclosed herein in order to ensure that the phosphorus of the at least one material 328 has sufficient time to melt, diffuse into the PCD table 302, and form the alloy or intermediate compound.

For example, the PDC assembly 310 may be formed by placing a powder of the one or more phosphorus materials, such as red phosphorus, in a crucible. The crucible may be formed from a ceramic or a refractory metal, such as a tantalum can, a niobium can, a molybdenum can, or a zirconium can. The precursor PDC 300 may be pressed into or placed adjacent to the one or more phosphorus materials. For example less than about 0.1 inches of the at least one lateral of the PCD table 302 may be exposed to the one or more phosphorus materials. The PDC assembly 310 may be placed in a furnace and subjected to a heating process. The furnace may be a vacuum furnace or a furnace including an inert atmosphere. For example, the PDC assembly 310 may be subjected to a temperature greater than about 650° C. and a pressure less than about $10^{-3}$ torr for a time sufficient to cause alloying (e.g., about 12 hours). During the heating process, phosphorus of the one or more phosphorous materials may melt and infiltrate and/or diffuse into the at least one Group VIII metal of the precursor PCD table 302 to form an alloy. The alloy may include CoP, $Co_2P$, elemental cobalt, elemental phosphorous, or combinations thereof. The alloy may not contain elements from the crucible, such as niobium, molybdenum, or zirconium. Due to the possible presence of elemental phosphorous, the resulting PDC may continue to be subjected to an at least partial vacuum and/or an inert atmosphere after the alloy is formed or until the PDC reaches ambient temperature due to the reactivity of the elemental phosphorus.

In another embodiment, the precursor PDC assembly 310 may be subjected to a second HPHT process under any of the diamond-stable HPHT conditions disclosed herein when the temperature of the heating process is outside the diamond-stable region, such as about 650° C. or greater. Heating the precursor PDC assembly 310 in a second HPHT process under any of the disclosed diamond-stable HPHT conditions may help prevent or reduce graphitization of the diamond grains of the PCD table 302, while allowing alloying of the at least one group VIII metal with phosphorous and/or the at least one other alloying elements disclosed herein.

In addition to or as an alternative to providing phosphorous and/or any of the at least one other alloying elements disclosed herein, in an embodiment, the substrate 104 may include one or more phosphorus materials and/or the at least one other alloying elements disclosed herein (e.g., boron). For example, the substrate 104 may include a mixture of the one or more phosphorus materials with at least one Group VIII metal, the one or more phosphorus materials alloyed with the at least one Group VIII metal, or the one or more phosphorus materials may at least occupy a portion of the substrate 104 without the at least one Group VIII metal present. In another embodiment, the substrate 104 may comprise a cobalt-cemented tungsten carbide substrate including about 9 weight % to about 13 weight % cobalt; about 1 weight % to about 5 weight % phosphorous, boron, the at least one other alloying elements disclosed herein, or combinations thereof; and about 82 weight % to about 90 weight % tungsten carbide. In another embodiment, the diamond particles 326 may be at least partially doped with the one or more phosphorus materials and/or any of the at least one other alloying elements disclosed herein (e.g., boron).

Figure 3C:
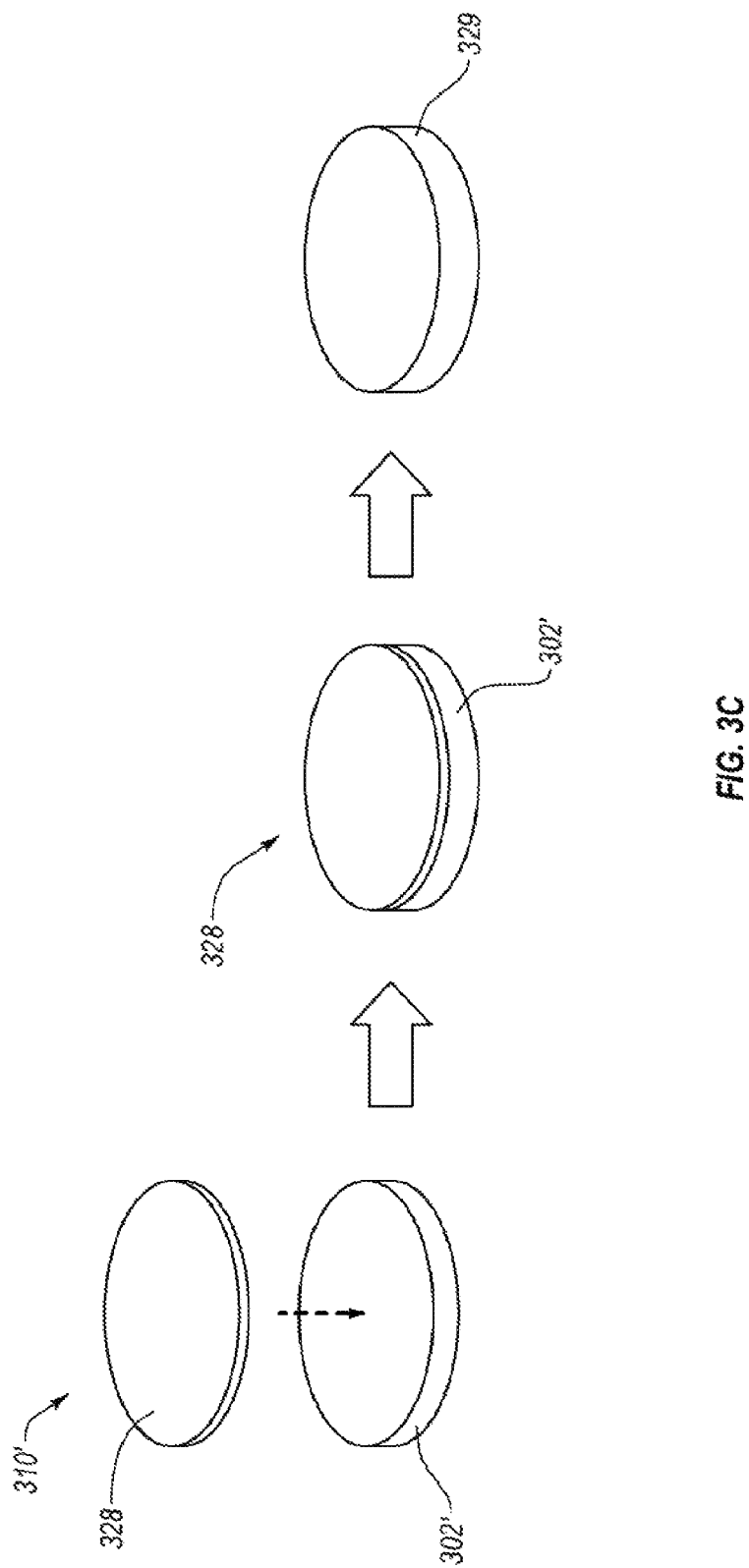
FIG. 3C is a schematic illustration of an assembly used to fabricate a treated PCD table used in the fabrication the PDC shown in FIGS. 1A to 1D according to another embodiment of a method.

FIG. 3C is a schematic illustration of an assembly 310' during the fabrication of a treated PCD table that may be used in the fabrication of the PDC 100 shown in FIGS. 1A to 1D according to another embodiment of a method. In an embodiment, a preformed PCD table 302' may be manufactured using a method the same or a substantially similar to the method illustrated in FIG. 3A. As such, the preformed PCD table 302' may include at least one Group VIII metal at least partially occupying a plurality of interstitial regions therein For example, the PCD table 302 may be separated from the substrate 104 illustrated in FIG. 3A to form a preformed PCD table 302'. For example, the PCD table 302 may be separated from the substrate 104 using grinding, lapping, laser cutting, electrical discharge machining ("EDM"), combinations thereof, or any other suitable method.

In an embodiment, the preformed PCD table 302' may be formed without the use of the substrate 104. A volume of diamond particles having any of the above-mentioned average particle sizes, compositions, and distributions may be mixed with a small amount of catalyst material including the at least one Group VIII metal. For example the amount of catalyst material present in the volume of diamond particles may be less than about 7.5 weight %. The volume of diamond particles is then positioned in a pressure transmitting medium and then subjected to an HPHT sintering process using any of the HPHT process conditions disclosed herein. The presence of a catalyst facilitates intergrowth between the volume of diamond particles during the HPHT sintering process to form a PCD table comprising bonded diamond grains defining a plurality of interstitial regions having the catalyst disposed within at least a portion of the plurality of interstitial regions.

In an embodiment, the preformed PCD table 302' may be formed by placing a disk containing a catalyst material including at least one Group VIII metal adjacent to the volume of diamond particles having any of the above-mentioned average particle sizes and distributions. The volume of diamond particles and the disk containing the catalyst material are placed in a pressuring transmitting device to form a cell assembly. The cell assembly is then subjected in an HPHT process (e.g., a temperature of at least about 1000° C. and a pressure of at least about 5.0 GPa). The catalyst material from the disk infiltrates the volume of diamond particles and occupies at least a portion of the plurality of interstitial regions of the PCD table so formed.

Still referring to FIG. 3C, the assembly 310' may be formed by placing the at least one material 328 including one or more phosphorus materials and/or any of the at least one other alloying elements disclosed herein adjacent to a surface of the preformed PCD table 302'. For example, the one or more phosphorus materials and/or any of the at least one other alloying elements disclosed herein may be placed in a can assembly and the preformed PCD table 302' may be pressed adjacent to the at least one material 328, positioned adjacent to the at least one material 328, or configured in contact with the at least one material 328. The assembly 310' may be subjected to a heating process (e.g., an effective temperature between about 200° C. to about 1000° C. and an at least partial vacuum having a pressure less than about $10^{-2}$ torr or an inert atmosphere) to alloy at least a portion of the at least one Group VIII metal in the preformed PCD table 302 with phosphorous and/or any of the at least one other alloying elements disclosed herein, as previously described, to form treated PCD table 329.

After the heating process, the treated PCD table 329 may be attached to any of the substrates disclosed herein. For example, the treated PCD table 329 may be attached to any of the substrates disclosed herein via a brazing technique, a second HPHT process, or another attachment technique. Suitable brazing and other re-attachment techniques for bonding the treated PCD table 329 to the substrate 104 are disclosed in U.S. Pat. No. 8,236,074, the disclosure of which is incorporated herein, in its entirety, by this reference. Depending on the technique used, the treated PCD table 329 may be attached to the substrate in any of the inert environments disclosed herein, such as a partial vacuum or in an inert atmosphere. For example, the assembly 310' may be sealed in an assembly enclosure while subjected to an at least a partial vacuum and/or an inert atmosphere such as argon gas.

In an embodiment, a portion of the treated PCD table 329 may be at least partially leached to deplete the treated PCD table 329 of the metallic constituent therein from a selected leached region. For example, the selected leached region may not include any phosphorous and/or any of the at least one other alloying element (e.g., boron), such as second region 118 shown in FIGS. 1C and 1D. The selected leached region may be placed adjacent to another substrate (e.g., a substrate 104) and subjected to a second HPHT process using any of the HPHT process conditions disclosed herein in order to infiltrate most, if not all of, the selected leached region with cobalt or other Group VIII metal from the substrate 104 or other source. Upon cooling from the second HPHT process, a strong metallurgical bond may be formed between the infiltrated PCD table and the substrate 104.

Figure 3D:
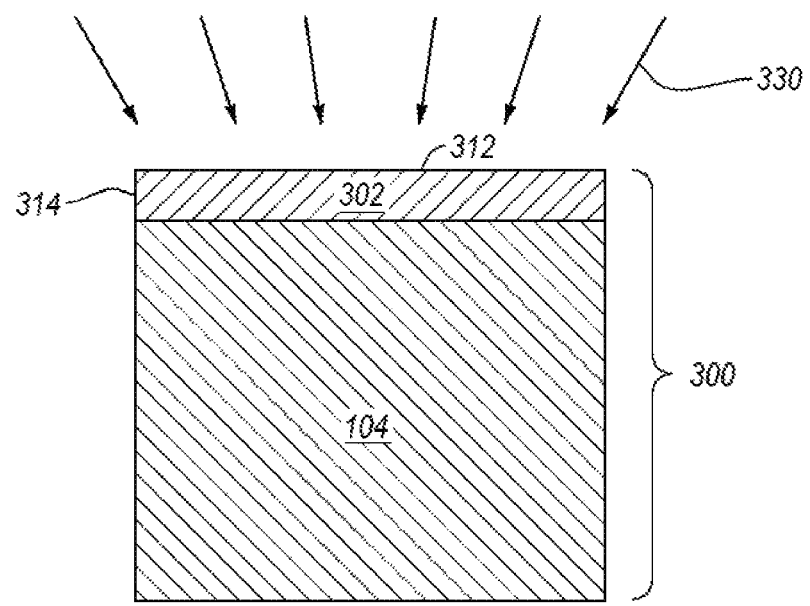
FIGS. 3D and 3E are cross-sectional views illustrating various stages in an embodiment of a method for implanting ions into the precursor PDC assembly during the fabrication of the PDC shown in FIGS. 1A and 1B according to an embodiment.
Figure 3E:
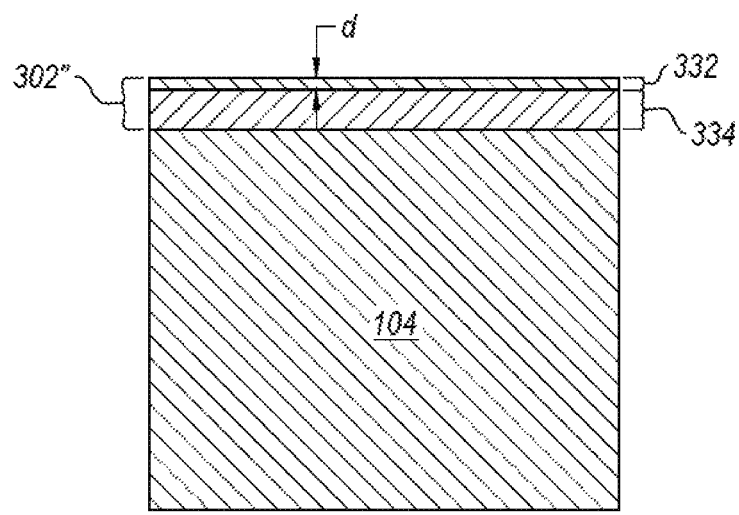

FIGS. 3D and 3E are cross-sectional views of a method for implanting ions (e.g., ions of any alloying element discussed herein) into the precursor PDC 300 shown in FIG. 3A to form the PDC 100 shown in FIGS. 1A to 1D according to an embodiment of a method. The precursor PDC 300 may be positioned in a chamber of an ion-implantation apparatus that includes an ion source (e.g., a phosphorus-ion source). A phosphorus ion may include, for example, a single phosphorus atom or a molecule containing phosphorus. In an embodiment, a plurality of phosphorus ions 330 may be directed at the PCD table 302. For example, the phosphorus ions 330 may be directed at an upper surface 312 and/or at least one lateral surface 314 of the PCD table 302 so that the phosphorus ions 330 are implanted into the at least one Group VIII metal of the PCD table 302. A depth d to which the implantation region 332 extends from the upper surface 312 may be about 1 nm to about 1500 nm, such as about 10 nm to about 1000 nm, about 50 nm to about 800 nm, or about 300 nm to about 800 nm. In some embodiments, the amount of the phosphorus ions 330 may be sufficient to under saturate, saturate or supersaturate at least a portion of the at least one Group VIII metal in the implantation region 332. By directing the phosphorus ions 330 at the upper surface 312 and/or the at least one lateral surface 314 with the same energy and dose, the implantation region 332 may exhibit the structure of the first region 116 shown in FIG. 1C or 1D. In addition to or as an alternative to phosphorous, ions of any of the one or more of the other alloying elements may also be implanted into the PCD table 302 to form an implantation region, as described above.

In some embodiments, the PCD table 302 may include a chamfer or other edge geometry, and the implantation region 332 may extend inwardly from such a chamfer. In another embodiment, a chamfer or other edge geometry may be formed in the PCD table after implantation with the phosphorus ions 330. For example, the chamfer may be formed by grinding, lapping, electro-discharge machining, or combinations of the foregoing. As a result of the additional phosphorus implanted into the implantation region 332, the thermal stability and/or wear resistance of the implantation region 332 may be greater than that of a region 334 adjacent to the substrate 104 that is unaffected by the ion-implantation process.

In an embodiment, a plasma that includes the phosphorus ions 330 may be generated from a phosphorus-containing gas using electron cyclotron resonance ("ECR"), a large-area pulsed radio frequency, or another suitable technique. For example, the phosphorus ions 330 may be generated by discharge of a phosphorus-containing gas, such as phosphine; or sputter erosion of phosphorus material electrode using a plasma, such as an argon plasma. The phosphorus ions 330 may be accelerated at the PCD table 302 using a high-voltage source so that the phosphorus ions 330 become embedded in the PCD table 302 to form the implantation region 332 therein. For example, the phosphorus ions 330 may be accelerated at the PCD table 302 with an energy of about 2 keV to about 50 keV. In some embodiments, the phosphorus ions 330 may be in the form of a high-energy beam of phosphorus ions 330 that may be directed at the PCD table 302. For example, the high-energy beam of phosphorus ions 330 may exhibit an energy of about 70 keV to about 100 keV. The dose of the phosphorus ions 330 implanted into the PCD table 302 may be about $10^{12}$ ions per $cm^2$ to about $10^{20}$ ions per $cm^2$, such as about $10^{12}$ ions per $cm^2$ to about $10^{16}$ ions per $cm^2$ or about $10^{16}$ ions per $cm^2$ to about $10^{18}$ ions per $cm^2$. One or more of the other alloying elements may be implanted into the PCD table 302 to form an implantation region as described above.

In an embodiment, the ion-implantation process may be performed at room temperature and ambient pressure. In other embodiments, the ion-implantation process may be performed with the PCD table 302 and the Group VIII metal therein being at an elevated temperature at which the phosphorus has a higher solubility in the Group VIII metal, such as about 500° C. to about 1000° C.

In an embodiment, the PDC 300" may be thermally annealed subsequent to implantation at a suitable temperature to cause the phosphorus ions 330 that are implanted into the implantation region 332 of the implanted PCD table 302" to diffuse deeper into the implanted PCD table 302" or react with the at least one Group VIII metal therein to form an alloy. For example, the PCD table 302" of the PDC 300" may be exposed to a temperature of about 100° C. to about 1000° C. in air or an inert atmosphere (e.g., at least partial vacuum or inert-gas shielded environment). For example, the temperature to which the implanted PCD table 302" may be exposed may be about 300° C. to about 500° C.

Other chemical elements (e.g., any of the alloying elements disclosed herein) may be implanted into the at least one Group VIII metal of the PCD table 302 as an alternative to or in addition to phosphorus ions 330 to improve the thermal stability and/or wear resistance of the PCD table 302. For example, in an embodiment, boron ions, nitrogen ions, carbon ions, or combinations thereof may be implanted into the at least one Group VIII metal of the PCD table 302 (e.g., to at least saturate or, in some embodiments, supersaturate the at least one Group VIII metal).

Figure 4:
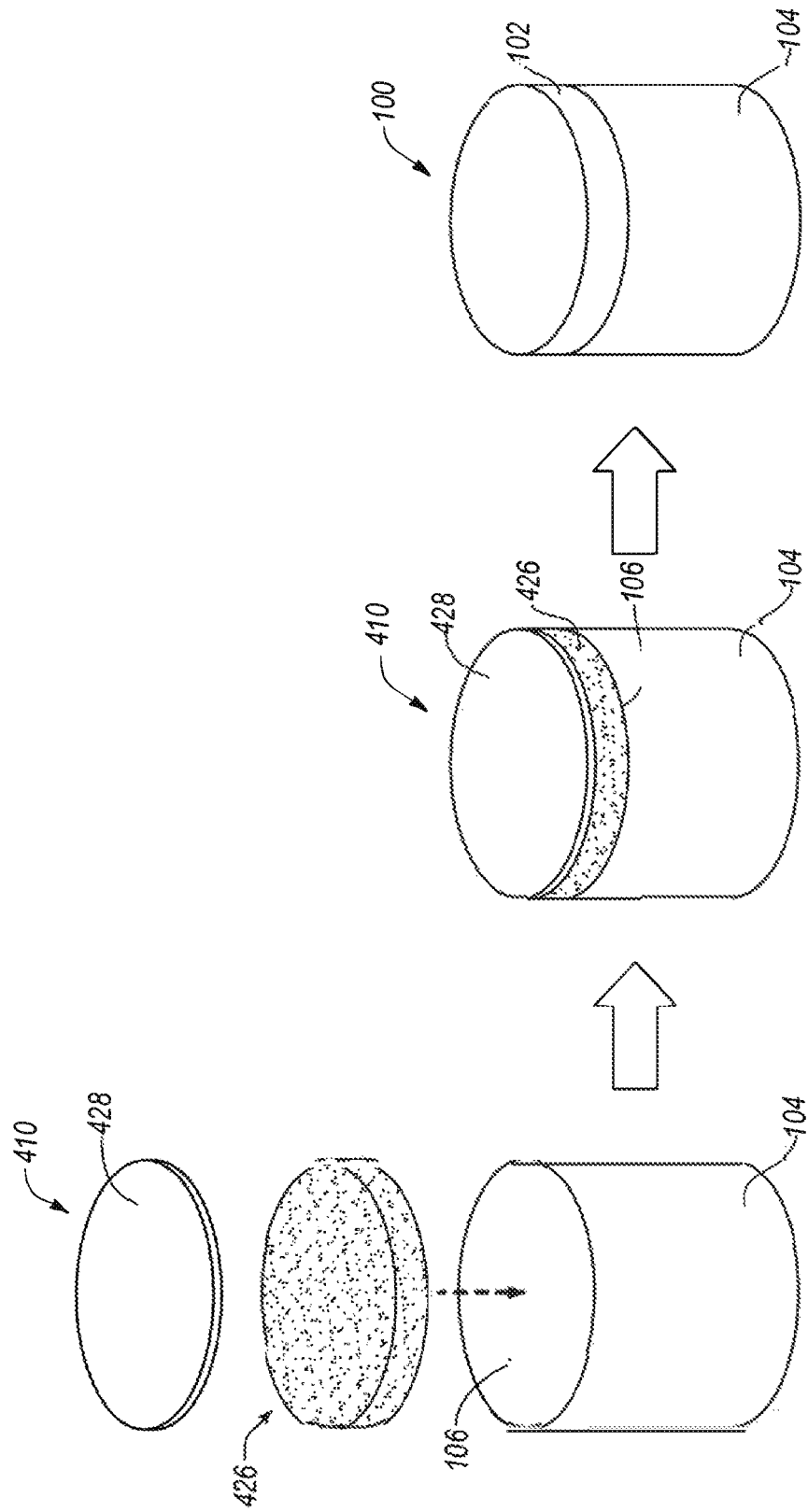
FIG. 4 is a schematic diagram at different stages during the fabrication of the PDC shown in FIGS. 1A and 1B according to other embodiment.

FIG. 4 is a schematic diagram at different stages during the fabrication of the PDC 100 shown in FIGS. 1A to 1D in a single HPHT process, according to another embodiment of a method. Referring to FIG. 4, an assembly 410 including a volume of diamond particles 426 is positioned between the interfacial surface 106 of the substrate 104 and at least one material 428 having one or more phosphorus materials therein and/or any of the at least one other alloying elements disclosed herein. For example, the at least one material 428 may include particles of the one or more phosphorus materials, a thin disc of the one or more phosphorus materials, a green body of particles of the one or more phosphorus materials, any of the other alloying elements disclosed herein, or combinations thereof. As previously discussed, the substrate 104 may include a cementing constituent comprising at least one Group VIII metal, such as cobalt, iron, nickel, or alloys thereof. For example, the substrate 104 may comprise a cobalt-cemented tungsten carbide substrate.

The assembly 410 may be enclosed in a suitable enclosure assembly. For example, the assembly 410 may be enclosed and sealed in the enclosure assembly while subjected to an at least partial vacuum (e.g., less than about $10^{-2}$ torr) and/or an inert atmosphere. For example, sealing the enclosure assembly while subjected to a vacuum and/or inert atmosphere may decrease the likelihood that any elemental phosphorus contained in the one or more phosphorus materials reacts with the atmosphere during the HPHT process. Suitable enclosure assemblies and sealing techniques (e.g., vacuum sealing techniques) for such enclosure assemblies that may be employed in the embodiments disclosed herein are disclosed in U.S. Pat. No. 8,236,074 which was previously incorporated by reference.

The assembly 410 may be placed in a pressure transmitting medium and subjected to a first portion of an HPHT process. For example, the first portion may be performed using an ultra-high pressure press to create temperature and pressure conditions at which diamond is stable. The temperature of the first portion may be at least about 1000° C. (e.g., about 1200° C. to about 1600° C.) and the pressure of the first portion may be at least 4.0 GPa (e.g., about 5.0 GPa to about 12 GPa or about 7.5 GPa to about 11 GPa) for a time sufficient to sinter the diamond particles to form a PCD table. The foregoing pressure values employed refer to the cell pressure in the pressure transmitting medium that transfers the pressure from the ultra-high pressure press to the assembly.

In an embodiment, during the first portion of the HPHT process, the at least one Group VIII metal from the substrate 104 or another source (e.g., metal-solvent catalyst mixed with the diamond particles) liquefies and infiltrates into the volume of diamond particles 426 and sinters the diamond particles together to form a PCD table having diamond grains exhibiting diamond-to-diamond bonding (e.g., $sp^3$ bonding) therebetween with the at least one Group VIII metal disposed in the interstitial regions between the diamond grains. In an embodiment, the at least one material 428 does not melt during the first portion of the HPHT process. Thus, in such an embodiment, the at least one material 428 has a melting temperature greater than the at least one Group VIII metal (e.g., cobalt) that is used. For example, if the substrate 104 is a cobalt-cemented tungsten carbide substrate, cobalt from the substrate 104 may be liquefied and infiltrate the volume of diamond particles 426 to catalyze formation of the PCD table, and the cobalt may subsequently be cooled to below its melting point or range.

In another embodiment, the at least one material 428 may be enclosed in a protective enclosure made from a material that does not melt during the first portion even though the phosphorus of the at least one material 428 may melt at a relatively low temperature. Thus, in this embodiment, the protective enclosure has a melting temperature or range greater than the at least one Group VIII metal (e.g., cobalt) that is used. Suitable materials for the protective enclosure include, but are not limited to, silicon, iridium, zirconium, molybdenum, tungsten, tungsten carbide, niobium, tantalum, titanium, another refractory material, or alloys of one or more of the foregoing.

After sintering the diamond particles to form the PCD table in the first portion, in a second portion of an HPHT process, the temperature may be increased from the temperature employed in the first portion, while still maintaining application of the same, less, or higher cell pressure to maintain diamond-stable conditions. For example, the temperature of the second portion of the HPHT process is chosen to partially or completely diffuse/melt the one or more alloying material (e.g., phosphorus) of the at least one material 428, which then alloys with the at least one Group VIII metal interstitially disposed in the PCD table and forms the PCD table 102 having the alloy disposed interstitially between at least some of the diamond grains. In another embodiment, the protective enclosure may be melted or at least softened to promote diffusion of the at least one alloying material (e.g., phosphorus) into the at least one Group VIII metal. Optionally, the temperature of the second portion of the HPHT process may be controlled so that the at least one Group VIII metal is still liquid or partially liquid so that alloying with the at least one alloying material occurs in the liquid phase, which typically speeds diffusion. However, in some embodiments, diffusion may occur via solid state and/or liquid diffusion, without limitation.

Before or after alloying, the PDC 100 may be subjected to a finishing process to, for example, chamfer the PCD table and/or planarize the upper surface thereof. The temperature of the second portion of the HPHT process may be about 1500° C. to about 1900° C., and the temperature of the first portion of the HPHT process may be about 1350° C. to about 1450° C. After and/or during cooling from the second portion of the HPHT process, the PCD table 102 bonds to the substrate 104. As discussed above, the alloying of the at least one Group VIII metal with the at least one alloying element may lower a melting temperature of the at least one Group VIII metal, at least one of a bulk modulus, and/or coefficient of thermal expansion of the at least one Group VIII metal.

In an embodiment, the second portion of the HPHT process is not needed. In an embodiment, a first cell assembly may include a volume of diamond particles 426 positioned adjacent to an interfacial surface 106 of a substrate 104. The first cell assembly may be placed in a pressure transmitting medium and subjected to an HPHT process (e.g., a temperature greater than about 1000° C. and a pressure greater than about 4.0 GPa) using any of the HPHT process conditions disclosed herein. During the HPHT process, at least one Group VIII metal from the substrate 104 or another source liquefies and infiltrates into the volume of diamond particles 426 and sinters the diamond particles to form a PCD table or a PCD table bonded to a substrate of a PDC. After the HPHT process, the PCD table and/or PDC may be allowed to cool and at least one material 428 (e.g., any of the at least one other alloying elements) may be positioned adjacent to an upper surface of the PCD table to form a second cell assembly. The PCD table and the at least one material 428 may be subjected to a second heating process. The second heating process may performed in an inert environment including a furnace including an at least partial vacuum (e.g., a vacuum of at least about $10^{-2}$ torr) and/or an inert atmosphere including any of the inert gas(es) disclosed herein. In an embodiment, the second heating process may include a temperature and a pressure that are within diamond-stable conditions. The temperature of the second heating process may be chosen to at least partially melt and/or diffuse the at least one material 428 into the PCD table, which then alloys with the at least one Group VIII metal interstitially disposed in the PCD table and forms the PCD table 102 having the alloy disposed interstitially between at least some of the diamond grains.

In an embodiment, the PDC 100 may be formed in a single HPHT process without needing a second heating process or a second portion of an HPHT process. In an embodiment, when the at least one alloying element is copper or a copper alloy, the copper or copper alloy may not always infiltrate the un-sintered diamond particles under certain conditions. For example, after the at least one Group VIII metal has infiltrated (or as it infiltrates the diamond powder) and at least begins to sinter the diamond particles, copper may be able and/or begin to alloy with the at least one Group VIII metal. Such a process may allow materials that would not typically infiltrate diamond powder to do so during or after infiltration by Group VIII metal.

In some embodiments, the PDC 100 may be machined after alloying the at least one Group VIII metal with one or more phosphorus materials and/or any of the other ones of the at least one alloying elements disclosed herein (e.g., boron). For example, the PDC 100 may be machined to form the chamfer 113 or planarize the upper surface 112. In some embodiments, machining the PDC 100 may remove portions of the PCD 102 table containing the alloy For example, machining the chamfer 113 in the PCD table 102 may remove at least some of the alloy from the periphery of the PCD table 102 and planarizing the upper surface 112 may remove at least some of the alloy from the upper surface 112. In an embodiment, the PDC 100 may be formed in a manner that minimizes machining of the PCD table 102 and/or removal of the alloy after alloying the Group VIII metal with the one or more phosphorous materials and/or any of the other alloying elements.

Figure 5A:
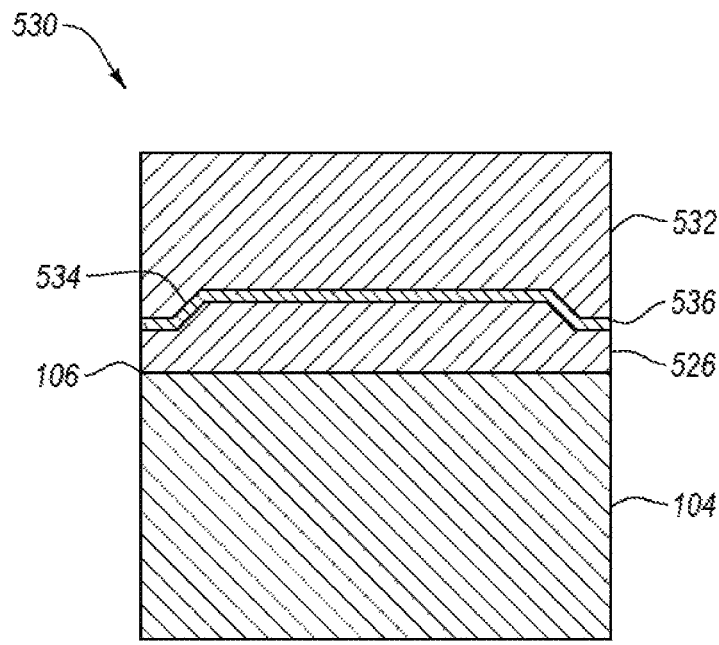
FIG. 5A is a cross-sectional view of an assembly including a shaping medium for at least partially defining a shape of a PCD table to be formed during a method, according to an embodiment.

FIG. 5A is a cross-sectional view of an assembly 530 that is configured to minimize or reduce machining of a PCD table after forming a PDC. In such an embodiment, the assembly 530 may include a pre-shaped shaping medium 532 (e.g., a slug or mold). The shaping medium may include a contact surface 534 that contacts a volume of diamond particles 526. The contact surface 534 may exhibit a topography that molds the volume of diamond particles 526 into a desired shape. For example, the contact surface 534 may mold the volume of diamond particles 526 to include at least one of a chamfer, a planar upper surface, a step, another suitable shape, another suitable feature, or combinations thereof after sintering. The shaping medium 532 may include a material that substantially maintains the shape of the contact surface 534 during the HPHT process. For example, the shaping medium may include hexagonal boron nitride ("HBN"). However, the shaping medium 532 and/or the contact surface 534 may deform during the HPHT process. As such, in some embodiments, the contact surface 534 may be configured to account for the deformation. The HBN may be sintered HBN or cold-pressed HBN powder.

In an embodiment, the assembly 530 may include a coating 536 applied to at least a portion of the contact surface 534. The coating 536 may include one or more phosphorus materials and/or any of the other alloying elements disclosed herein. In an embodiment, the coating 536 may include two or more coatings. The coating 536 may be applied to at least a portion of the contact surface 534 using any suitable method, such as spraying, dipping, pressing, painting, chemical vapor deposition, physical vapor deposition, or combinations thereof. The coating 536 may exhibit a thickness configured to enable one or more materials from the coating 536 to diffuse into the alloy of a PCD table to be formed at a depth measured from an upper surface thereof. For example, the coating 536 may exhibit a thickness that enables the one or more materials from the coating 536 to be present in the alloy at a depth of at least about 200 µm, such as about 250 µm to about 400 µm. In an embodiment, the coating 536 may be applied substantially uniformly to the entire contact surface 534. In other embodiments, the coating 536 may be applied non-uniformly to the contact surface 534. For example, only portions of the contact surface 534 may include a coating applied thereto and/or the thickness of the coating 536 may vary. The non-uniform coating 536 may enable the PDC to include at least one region exhibiting thermal stability and at least one region exhibiting high strength. The coating 536 may be configured to prevent mixing of the volume of diamond particles 526 with the one or more materials of the coating 536 prior to an HPHT process.

The volume of diamond particles 526 are positioned between an interfacial surface 106 of the substrate 104 and the contact surface 534 of the shaping medium 532 having the coating 536 applied thereto. The substrate 104 may include a cementing constituent comprising at least one Group VIII metal, such as cobalt, iron, nickel, or alloys thereof. Similar to the assembly 410 shown in FIG. 4, the assembly 530 may be enclosed in a suitable enclosure assembly while subjected to an inert environment (e.g., a vacuum of about $10^{-2}$ torr or less and/or an inert atmosphere).

In an embodiment, the assembly 530 may be placed in a pressure transmitting medium and subjected to a first stage HPHT process. However, in yet another embodiment, the assembly 530 may be subjected to a single HPHT process instead of a staged HPHT process. The first stage HPHT process may be configured to form a PCD table 502. The temperature of the first stage HPHT process may be at least about 1000° C. and the cell pressure may be at least about 4.0 GPa for a time sufficient to sinter the diamond particles. During the first stage HPHT process, the at least one Group VIII metal from the substrate 104 may liquefy and infiltrate into the volume of diamond particles 526 and sinter the diamond particles together to form a PCD table 502 including diamond grains exhibiting diamond-to-diamond bonding therebetween. In an embodiment, the coating 536 may be configured to not substantially melt or diffuse into the volume of diamond particles 526 during the first stage HPHT process.

In an embodiment, the assembly 530 may be subjected to a second stage HPHT process after the first stage HPHT process. In the second stage HPHT process, the temperature is increased from the temperature employed in the first stage HPHT process, while maintaining application of the same, less, or higher cell pressure to maintain diamond-stable conditions. For example, the temperature of the second stage HPHT process is chosen to partially or completely diffuse/melt the coating 536, which may cause at least some of the one or more materials of the coating 536 to alloy with the at least one Group VIII metal interstitially disposed in the PCD table 502. As discussed above, alloying the at least one Group VIII metal with the at least one alloying element lowers a melting temperature of the at least one Group VIII metal and at least one of a bulk modulus or coefficient of thermal expansion of the at least one Group VIII metal.

In an embodiment, the coating 536 may include one or more materials that substantially diffuse or melt at temperatures that are lower than the first stage HPHT process temperature. For example, the coating 536 may include phosphorus, which melts a relatively low temperature. In such an embodiment, the assembly 530 may include a component that prevents the one or more materials from substantially diffusing or melting into the volume of diamond particles 526 or the PCD table 502 until the second stage HPHT process. For example, the coating 536 that includes phosphorous may be applied to the contact surface 534. The assembly 530 may include a second coating that is applied to the coating 536 that prevents, inhibits, or slows the phosphorus from melting or diffusing into the volume of diamond particles 526 or PCD table 502 until the second stage HPHT process. In an embodiment, the assembly 530 may include a barrier that prevents, inhibits, or slows the phosphorous coating from melting or diffusing into the volume of diamond particles 526 or PCD table 502 until the second stage HPHT process. The second coating or the barrier may include silicon, iridium, zirconium, molybdenum, tungsten, tungsten carbide, niobium, tantalum, titanium, another refractory material, or alloys of one or more of the foregoing.

Figure 5B:
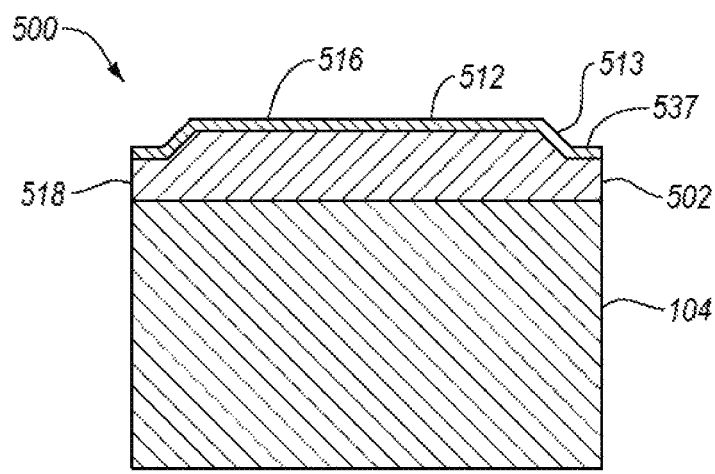
FIG. 5B is a cross-sectional view of a PDC formed from processing the assembly shown in FIG. 5A according to an embodiment.

FIG. 5B is a cross-sectional view of a PDC 500 formed from HPHT processing the assembly 530 shown in FIG. 5A, according to an embodiment. The PDC 500 may include the PCD table 502 that is bonded to the substrate 104. The PCD table 502 may exhibit a shape that was molded or at least partially defined by the contact surface 534 of the shaping medium 532. For example, the PCD table 502 may include a chamfer 513, a substantially planar upper surface 512, and a step 537. In some embodiments, the PCD table 502 may require substantially less machining than a PCD table formed without using the shaping medium 532. For example, the PCD table 502 may only be machined (e.g., centerless ground) to remove the step 537. In other embodiments, the PCD table 502 may require no machining. The PCD table 502 may also include a first region 516 extending inwardly from the upper surface 512 and generally contouring the chamfer 513 and the step 537. The first region 516 may include an alloy in the interstitial regions thereof including the one or more materials of the coating 536 alloyed the at least one Group VIII metal. The PCD table 502 may also include a second region 518 that may be formed adjacent to the substrate 104. The second region 518 may be substantially free of the alloy in the interstitial regions thereof. In an embodiment, the alloy may be generally uniformly distributed throughout the first region 516 or the alloy may exhibit a concentration gradient in the first region 516.

Figure 6:
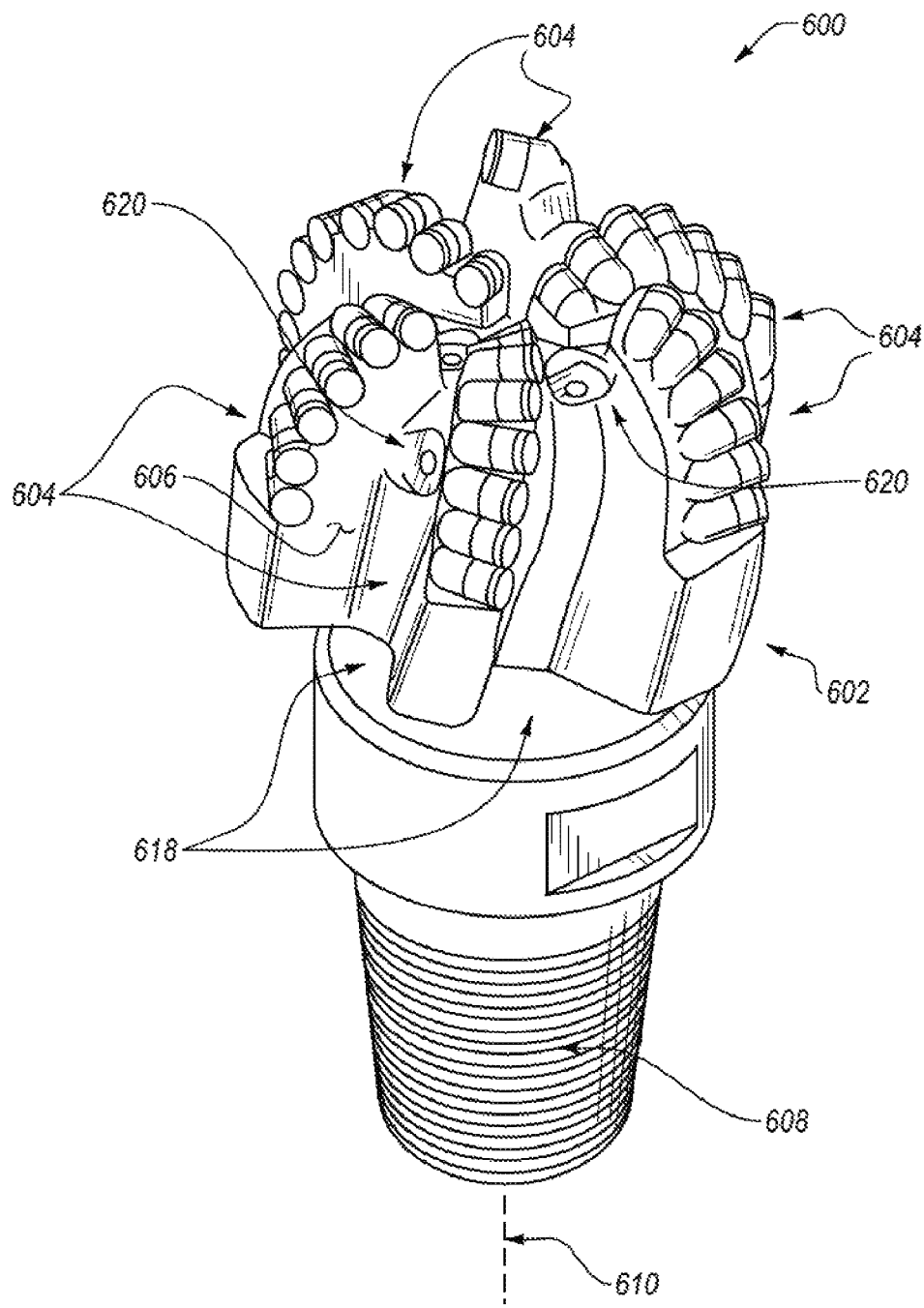
FIG. 6 is an isometric view of an embodiment of a rotary drill bit that may employ one or more of the disclosed PDC embodiments.
Figure 7:
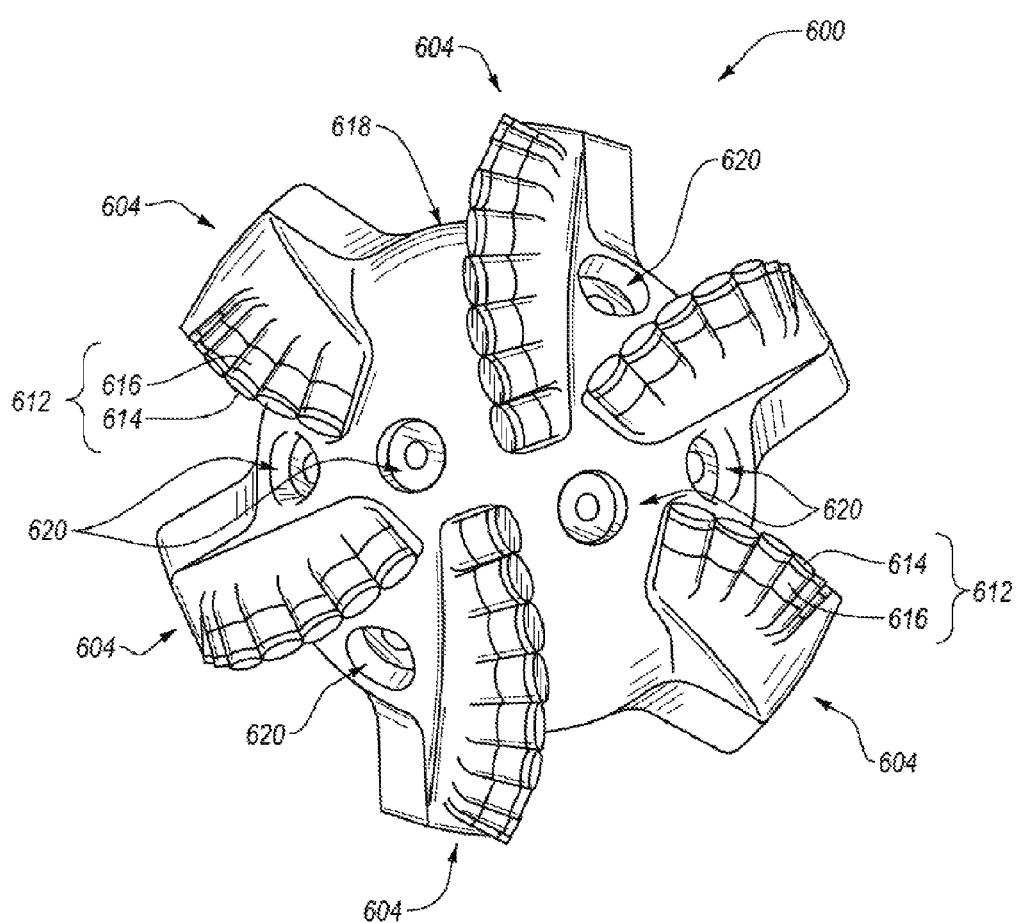
FIG. 7 is a top elevation view of the rotary drill bit shown in FIG. 6.

FIG. 6 is an isometric view and FIG. 7 is a top elevation view of an embodiment of a rotary drill bit 600 that includes at least one PDC configured according to any of the disclosed PDC embodiments. The rotary drill bit 600 comprises a bit body 602 that includes radially and longitudinally extending blades 604 having leading faces 606, and a threaded pin connection 608 for connecting the bit body 602 to a drilling string. The bit body 602 defines a leading end structure for drilling into a subterranean formation by rotation about a longitudinal axis 610 and application of weight-on-bit. At least one PDC, configured according to any of the disclosed PDC embodiments, may be affixed to the bit body 602. With reference to FIG. 6, each of a plurality of PDCs 612 is secured to the blades 604 of the bit body 602. For example, with reference to FIG. 7, each PDC 612 may include a PCD table 614 bonded to a substrate 616. More generally, the PDCs 612 may comprise any PDC disclosed herein, without limitation. In addition, if desired, in some embodiments, a number of the PDCs 612 may be conventional in construction. Also, circumferentially adjacent blades 604 define so-called junk slots 620 therebetween. Additionally, the rotary drill bit 600 includes a plurality of nozzle cavities 618 for communicating drilling fluid from the interior of the rotary drill bit 600 to the PDCs 612.

FIGS. 6 and 7 merely depict one embodiment of a rotary drill bit that employs at least one PDC fabricated and structured in accordance with the disclosed embodiments, without limitation. The rotary drill bit 600 is used to represent any number of earth-boring tools or drilling tools, including, for example, core bits, roller-cone bits, fixed-cutter bits, eccentric bits, bi-center bits, reamers, reamer wings, or any other downhole tool including superabrasive compacts, without limitation.

The PDCs disclosed herein (e.g., PDC 100 of FIGS. 1A to 1D) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used in any apparatus or structure in which at least one conventional PDC is typically used. In one embodiment, a rotor and a stator, assembled to form a thrust-bearing apparatus, may each include one or more PDCs (e.g., PDC 100 of FIGS. 1A to 1D) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing PDCs disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,274,900; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be opened ended and have the same meaning as the word "comprising" and variants thereof (e.g., "comprise" and "comprises").

The invention claimed is:

1. A method of fabricating a thermally-stable polycrystalline diamond compact, the method comprising:
forming a polycrystalline diamond compact including a polycrystalline diamond table adjacent to an interfacial surface of a substrate, the polycrystalline diamond table including an upper surface remote from the interfacial surface of the substrate, at least one lateral surface, and a chamfer extending between the at least one lateral surface and the upper surface, wherein the polycrystalline diamond table includes a plurality of bonded diamond grains defining a plurality of interstitial regions, at least a portion of the plurality of interstitial regions including at least one Group VIII metal disposed therein;
subjecting the polycrystalline diamond compact and one or more alloying materials including phosphorous to an inert environment; and
while subjected to the inert environment, heating the polycrystalline diamond compact and the one or more alloying materials to an effective temperature and for an effective time to alloy at least some of the at least one Group VIII metal with the phosphorous;
wherein, prior to alloying the at least one Group VIII metal with the phosphorous, the one or more alloying materials are positioned external to the polycrystalline diamond compact.

2. The method of claim 1, wherein the one or more alloying materials are positioned adjacent to at least a portion of the upper surface of the polycrystalline diamond table.

3. The method of claim 1, wherein subjecting the polycrystalline diamond compact and one or more alloying materials including phosphorous to an inert environment includes subjecting the assembly to a vacuum of less than about 10-2 torr.

4. The method of claim 1, wherein subjecting the polycrystalline diamond compact and one or more alloying materials including phosphorous to an inert environment includes subjecting the at least the polycrystalline diamond compact to an inert atmosphere.

5. The method of claim 4, wherein the inert atmosphere includes at least one of argon, helium, nitrogen, or carbon dioxide.

6. The method of claim 1, wherein the phosphorous of the one or more alloying materials includes phosphorus powder.

7. The method of claim 1, wherein the phosphorous of the one or more alloying materials includes at least one of white phosphorus, red phosphorus, violet phosphorus, or black phosphorus.

8. The method of claim 1 wherein heating the polycrystalline diamond compact and one or more alloying materials including phosphorous to an effective temperature and for an effective time to alloy at least some of the at least one Group VIII metal with the phosphorous is performed under a diamond-stable high-pressure/high-temperature process.

9. The method of claim 1 wherein forming the polycrystalline diamond compact and heating the polycrystalline diamond compact and the one or more alloying materials are performed in different heating processes.

10. The method of claim 1, wherein:
heating the polycrystalline diamond compact and the one or more alloying materials to the effective temperature and for the effective time to alloy at least some of the at least one Group VIII metal with the phosphorous includes subjecting the polycrystalline diamond compact to a temperature of about 200° C. to about 1000° C.; or
heating the polycrystalline diamond compact and the one or more alloying materials to the effective temperature and for the effective time to alloy at least some of the at least one Group VIII metal with the phosphorous includes subjecting the polycrystalline diamond compact to the effective temperature for greater than about 12 hours.

11. The method of claim 1, wherein heating the polycrystalline diamond compact and the one or more alloying materials and subjecting the assembly to an inert environment is effective to form a first region in the polycrystalline diamond table adjacent to the upper surface thereof and a second region remote from the upper surface of the polycrystalline diamond table, wherein the first region includes an alloy disposed within at least a portion of the interstitial regions thereof and the second region is free of the alloy, wherein the alloy includes the at least one Group VIII metal and the phosphorus.

12. A method of fabricating a thermally-stable polycrystalline diamond compact, the method comprising:
providing a polycrystalline diamond compact including a polycrystalline diamond table bonded to an interfacial surface of a substrate, the polycrystalline diamond table including an upper surface remote from the interfacial surface of the substrate, at least one lateral surface, and a chamfer extending between the at least one lateral surface and the upper surface, wherein the polycrystalline diamond table includes a plurality of bonded diamond grains defining a plurality of interstitial regions, at least a portion of the plurality of interstitial regions including at least one Group VIII metal;
positioning one or more alloying materials adjacent to at least a portion of the upper surface, the at least one lateral surface, and the chamfer of the polycrystalline diamond table to form an assembly, wherein the one or more alloying materials include phosphorus;
subjecting the assembly to an inert environment; and
while the assembly is subjected to the inert environment, heating the assembly to an effective temperature and for an effective time to alloy at least some of the at least one Group VIII metal with the phosphorous.

13. The method of claim 12, wherein subjecting the assembly to an inert environment includes subjecting the assembly to a vacuum of less than about 10-2 torr.

14. The method of claim 12, wherein subjecting the assembly to an inert environment includes subjecting the assembly to a vacuum of about 10-3 torr to about 10-9 torr.

15. The method of claim 12, wherein heating the assembly to the effective temperature and for the effective time to alloy at least some of the at least one Group VIII metal with the phosphorus includes subjecting the assembly to a temperature of about 200° C. to about 1000° C.

16. The method of claim 12, wherein heating the assembly to the effective temperature and for the effective time to alloy at least some of the at least one Group VIII metal with the phosphorus is performed under a diamond-stable high-pressure/high-temperature process.

17. The method of claim 12, wherein heating the assembly to the effective temperature and for the effective time forms a first region in the polycrystalline diamond table adjacent to the upper surface thereof and a second region remote from the upper surface of the polycrystalline diamond table, wherein the first region includes an alloy disposed within at least a portion of the interstitial regions thereof and the second region is free of the alloy, wherein the alloy includes the at least one Group VIII metal and the phosphorus.

18. A method of fabricating a thermally-stable polycrystalline diamond compact, the method comprising:
forming a polycrystalline diamond compact including a polycrystalline diamond table adjacent to an interfacial surface of a substrate, the polycrystalline diamond table including a nonplanar upper surface remote from the interfacial surface of the substrate and at least one lateral surface, wherein the polycrystalline diamond table includes a plurality of bonded diamond grains defining a plurality of interstitial regions, at least a portion of the plurality of interstitial regions including at least one Group VIII metal disposed therein;
subjecting the polycrystalline diamond compact and one or more alloying materials including phosphorous to an inert environment; and
while subjected to the inert environment, heating the polycrystalline diamond compact and the one or more alloying materials to an effective temperature and for an effective time to alloy at least some of the at least one Group VIII metal with the phosphorous;
wherein, prior to alloying the at least one Group VIII metal with the phosphorous, the one or more alloying materials are positioned external to the polycrystalline diamond compact.

19. The method of claim 18, wherein the one or more alloying materials are positioned adjacent to at least a portion of the nonplanar upper surface of the polycrystalline diamond table.

20. The method of claim 18, wherein subjecting the polycrystalline diamond compact and one or more alloying materials including phosphorous to an inert environment includes subjecting the assembly to a vacuum of less than about 10-2 torr.

21. The method of claim 18, wherein subjecting the polycrystalline diamond compact and one or more alloying materials including phosphorous therein to an inert environment includes subjecting the at least the polycrystalline diamond compact to an inert atmosphere.

22. The method of claim 18, wherein the phosphorous of the one or more alloying materials includes at least one of white phosphorus, red phosphorus, violet phosphorus, or black phosphorus.

23. The method of claim 18, wherein heating the polycrystalline diamond compact and one or more alloying materials including phosphorous to an effective temperature and for an effective time to alloy at least some of the at least one Group VIII metal with the phosphorous is performed under a diamond-stable high-pressure/high-temperature process.

24. The method of claim 18, wherein heating the polycrystalline diamond compact and the one or more alloying materials to the effective temperature and for the effective time to alloy at least some of the at least one Group VIII metal with the phosphorous includes subjecting the polycrystalline diamond compact to a temperature of about 200° C. to about 1000° C.

25. The method of claim 18, wherein the nonplanar upper surface includes a planar portion and at least one lateral surface obliquely angled relative to the planar portion.

26. The method of claim 1, wherein the one or more alloying materials are positioned adjacent to at least a portion of the at least one lateral surface of the polycrystalline diamond table.

27. The method of claim 1, wherein the one or more alloying materials are positioned adjacent to at least a portion of the chamfer of the polycrystalline diamond table.

28. The method of claim 18, wherein the one or more alloying materials are positioned adjacent to at least a portion of the at least one lateral surface of the polycrystalline diamond table.

* * * * *